(12) United States Patent
Pan

(10) Patent No.: US 11,638,197 B1
(45) Date of Patent: Apr. 25, 2023

(54) METHOD AND APPARATUS FOR SUPPORTING UE-TO-NETWORK RELAY COMMUNICATION IN A WIRELESS COMMUNICATION SYSTEM

(71) Applicant: ASUSTek Computer Inc., Taipei (TW)

(72) Inventor: Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/964,581

(22) Filed: Oct. 12, 2022

Related U.S. Application Data

(60) Provisional application No. 63/272,070, filed on Oct. 26, 2021.

(51) Int. Cl.
*H04W 40/22* (2009.01)
*H04W 76/10* (2018.01)
*H04W 88/04* (2009.01)

(52) U.S. Cl.
CPC ........... *H04W 40/22* (2013.01); *H04W 76/10* (2018.02); *H04W 88/04* (2013.01)

(58) Field of Classification Search
None
See application file for complete search history.

(56) References Cited

U.S. PATENT DOCUMENTS

| | | | |
|---|---|---|---|
| 2017/0071028 A1* | 3/2017 | Kuo | H04W 8/06 |
| 2017/0086114 A1* | 3/2017 | Jung | H04W 52/46 |
| 2018/0213577 A1* | 7/2018 | Burbidge | H04W 76/10 |
| 2020/0029384 A1 | 1/2020 | Hong et al. | |
| 2020/0196225 A1* | 6/2020 | Wang | H04W 80/02 |
| 2021/0051758 A1* | 2/2021 | Xu | H04W 76/27 |
| 2021/0212151 A1* | 7/2021 | Paladugu | H04W 76/14 |
| 2021/0282195 A1* | 9/2021 | Paladugu | H04W 4/90 |
| 2022/0132617 A1 | 4/2022 | Hong et al. | |

* cited by examiner

*Primary Examiner* — Brian S Roberts
(74) *Attorney, Agent, or Firm* — Blue Capital Law Firm, P.C.

(57) ABSTRACT

A method and device are disclosed from the perspective of a remote User Equipment (UE). In one embodiment, the method includes the remote UE establishing a unicast link with a relay UE. The method further includes the remote UE establishing a Radio Resource Control (RRC) connection with a network via the relay UE, wherein a first Radio Link Control (RLC) entity is created and used for transmitting a first RRC message for request of establishing the RRC connection to the network via the relay UE. The method also includes the remote UE selecting a suitable cell. In addition, the method includes the remote UE releasing the first RLC entity in response to selection of the suitable cell. Furthermore, the method includes the remote UE transmitting a second RRC message to the network directly.

20 Claims, 14 Drawing Sheets

METHOD AND APPARATUS FOR SUPPORTING UE-TO-NETWORK RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/272,070 filed on Oct. 26, 2021, the entire disclosure of which is incorporated herein in its entirety by reference.

FIELD

This disclosure generally relates to wireless communication networks, and more particularly, to a method and apparatus for supporting UE-to-network relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a remote User Equipment (UE). In one embodiment, the method includes the remote UE establishing a unicast link with a relay UE. The method further includes the remote UE establishing a Radio Resource Control (RRC) connection with a network via the relay UE, wherein a first Radio Link Control (RLC) entity is created and used for transmitting a first RRC message for request of establishing the RRC connection to the network via the relay UE. The method also includes the remote UE selecting a suitable cell. In addition, the method includes the remote UE releasing the first RLC entity in response to selection of the suitable cell. Furthermore, the method includes the remote UE transmitting a second RRC message to the network directly.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.0.0, "Proximity based Services (ProSe) in the 5G System (5GS) (Release 17)"; TS 38.331 v16.6.0, "NR; Radio Resource Control (RRC) protocol specification (Release 16)"; and 3GPP email discussion [Post115-e][603] [Relay] Relaying CR to 38.331 (Huawei), "Draft_38331 Running CR for SL relay_v14_rapp.docx". The standards and documents listed above are hereby expressly incorporated by reference in their entirety.

Figure 1:
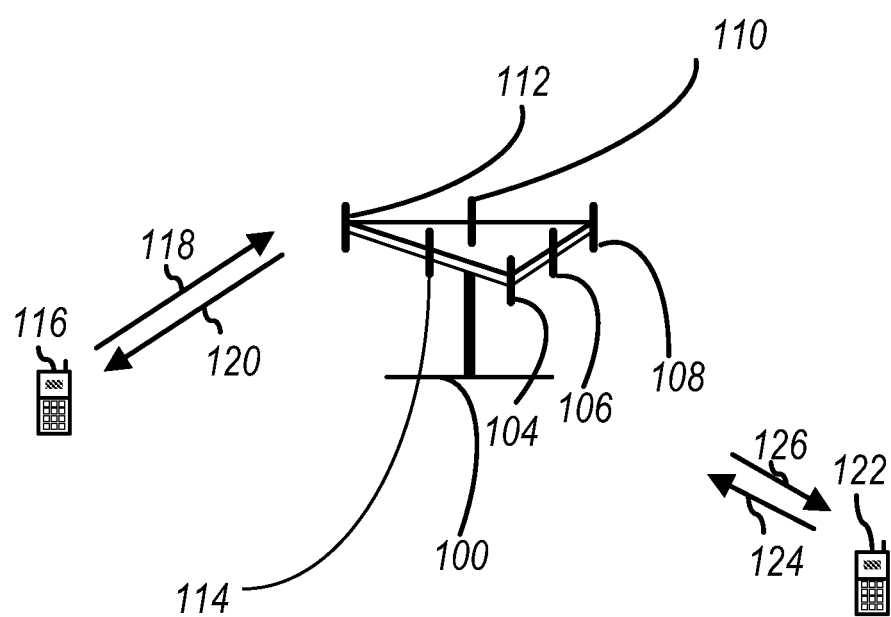
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
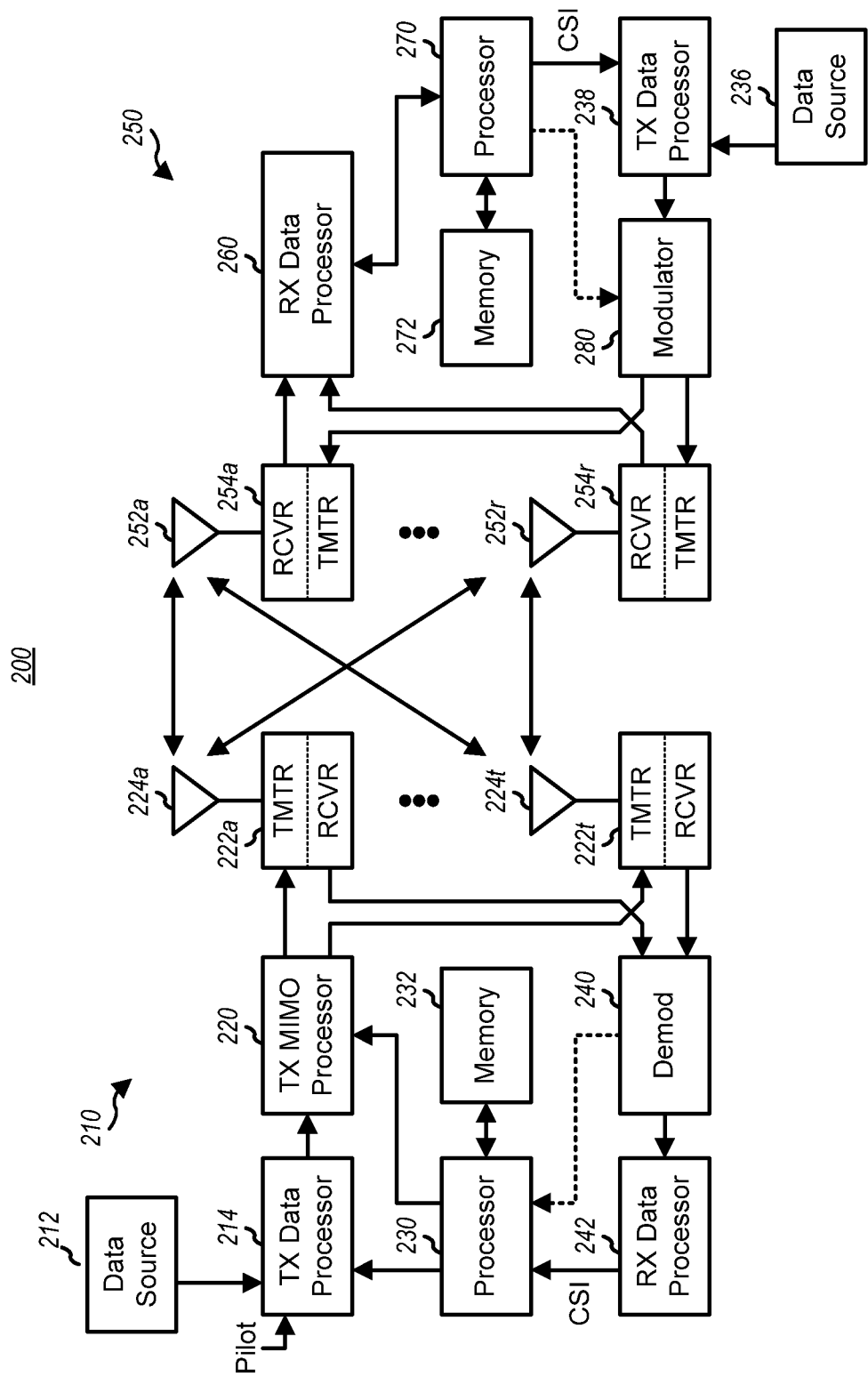
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
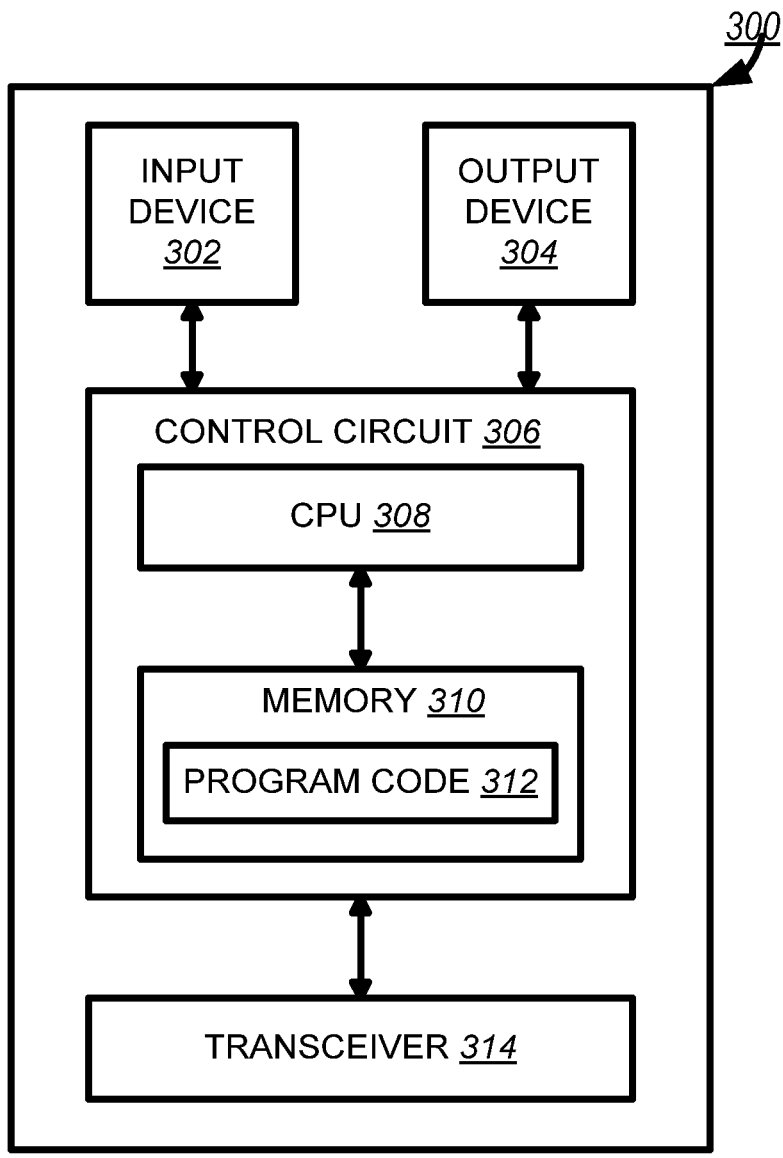
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
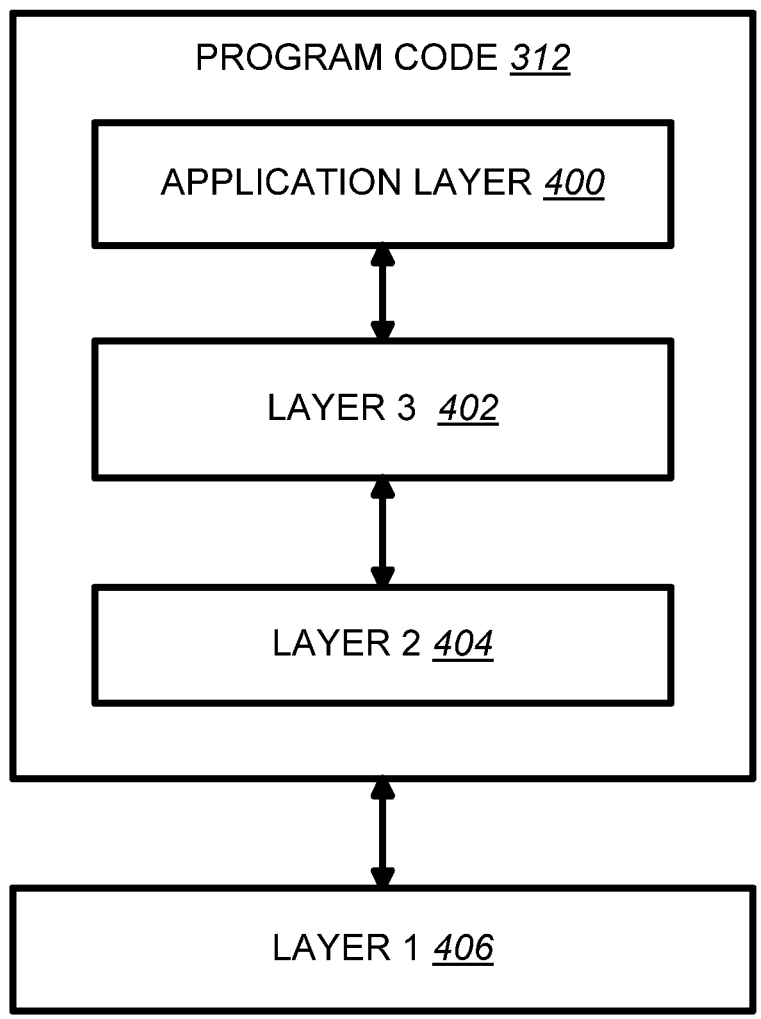
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion

406. The Layer 3 portion 402 generally performs radio resource control. The Layer 2 portion 404 generally performs link control. The Layer 1 portion 406 generally performs physical connections.

3GPP TS 23.304 introduced the following:

---

Figure 6:
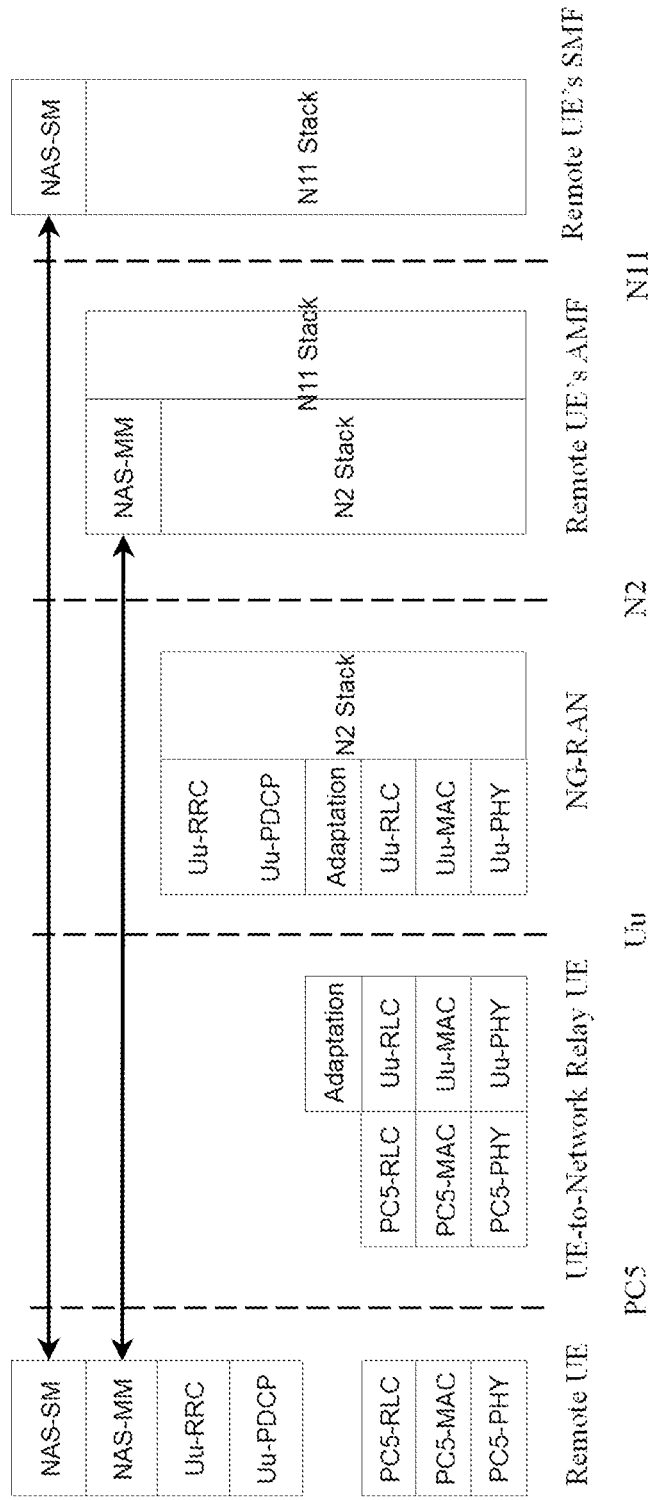
FIG. 6 is a reproduction of FIG. 6.1.1.7.2-1 of 3GPP TS 23.304 V17.0.0.
Figure 7:
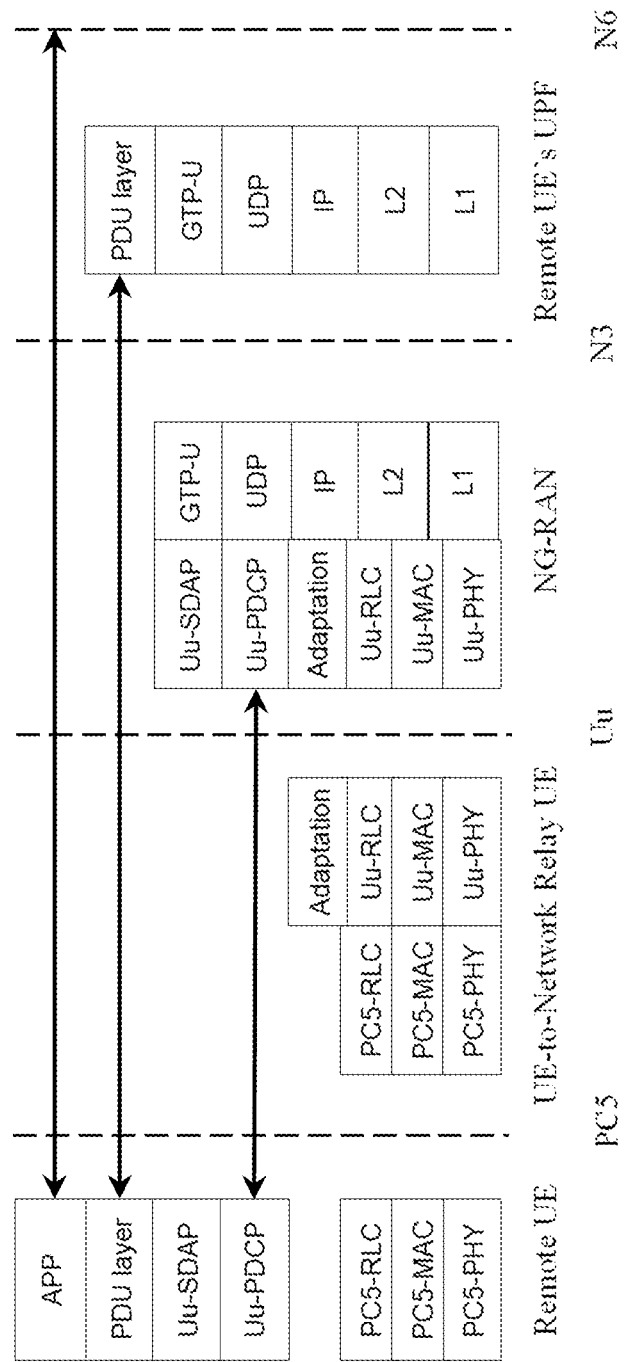
FIG. 7 is a reproduction of FIG. 6.1.2.3.2-1 of 3GPP TS 23.304 V17.0.0.

4.3.9     5G ProSe UE-to-Network Relay
4.3.9.1       General
Both 5G ProSe Layer-2 and Layer-3 UE-to-Network Relay entity provides the relaying
functionality to support connectivity to the network for 5G ProSe Remote UEs. It can be used
for both public safety services and commercial services (e.g. interactive service).
Both 5G ProSe Layer-2 and Layer-3 UE-to-Network Relay supports the following functions to
enable connectivity to the network:
    5G ProSe UE-to-Network Relay Discovery service as defined in clause 6.3.2.3, to allow
    discovery by the 5G ProSe Remote UE;
    access the 5GS as a UE as defined in TS 23.501 [4] with the enhancements as specified in
    clauses 6.2 and 6.6;
    relays unicast traffic (uplink and downlink) between the 5G ProSe Remote UE and the
    network, supporting IP, Ethernet or Unstructured traffic type.
    NOTE: Relaying MBS traffic to a 5G ProSe Remote UE by a 5G ProSe UE-to-Network Relay is
        not supported in this release of the specification.
[...]
4.2.7.2     5G ProSe Layer-2 UE-to-Network Relay reference architecture
FIG. 4.2.7.2-1 show the 5G ProSe Layer-2 UE-to-Network Relay reference architecture. The 5G
ProSe Layer-2 Remote UE and 5G ProSe Layer-2 UE-to-Network Relay may be served by the
same or different PLMNs. If the serving PLMNs of the 5G ProSe Layer-2 Remote UE and the 5G
ProSe Layer-2UE-to-Network Relay are different then NG-RAN is shared by the serving PLMNs,
see the 5G MOCN architecture in clause 5.18 of TS 23.501 [4].
        [FIG. 4.2.7.2-1 of 3GPP TS 23.304 V17.0.0, entitled "5G ProSe Layer-2
        UE-to-Network Relay reference architecture", is reproduced as FIG. 5]
    NOTE 1: Uu between the 5G ProSe Layer-2 Remote UE and NG-RAN consists of RRC, SDAP
        and PDCP.
    NOTE 2: The 5G ProSe Layer-2 Remote UE and 5G ProSe Layer-2 UE-to-Network Relay are
        served by the same NG-RAN. The Core Network entities (e.g., AMF, SMF, UPF)
        serving the 5G ProSe Layer-2 Remote UE and the 5G ProSe Layer-2 UE-to-Network
        Relay can be the same or different.
[...]
6.1.1.7.2         5G ProSe Layer-2 UE-to-Network Relay
The UE-UE protocol stacks for discovery and PC5 signalling defined in clause 6.1.1.2 apply to 5G
ProSe Remote UE and 5G ProSe Layer-2 UE-to-Network Relay.
FIG. 6.1.1.7.2-1 illustrates the protocol stack of the NAS connection for the 5G ProSe Layer-2
Remote UE for NAS-MM and NAS-SM. The NAS messages are transparently transferred
between the 5G ProSe Layer-2 Remote UE and NG-RAN over the 5G ProSe Layer-2 UE-to-
Network Relay using:
    PDCP end-to-end connection between the 5G ProSe Layer-2 Remote UE and NG-RAN,
    where the role of the 5G ProSe Layer-2 UE-to-Network Relay is to relay the PDUs over the
    signalling radio bear without any modifications and using the functionality of the
    adaptation layer as specified in TS 38.351 [28].
    Connection between NG-RAN and AMF over N2.
    Connection between AMF and SMF over N11.
Editor's note: Whether the adaptation layer is supported over PC5 will be determined by
        RAN WG2.
    [FIG. 6.1.1.7.2-1 of 3GPP TS 23.304 V17.0.0, entitled "End-to-End Control Plane for a
        Remote UE using Layer-2 UE-to-Network Relay", is reproduced as FIG. 6]
The control plane protocol stack used by the 5G ProSe Layer-2 UE-to-Network Relay is defined
in clause 8.2.2 of TS 23.501 [4].
[...]
6.1.2.3.2       5G ProSe Layer-2 UE-to-Network Relay
FIG. 6.1.2.2.2-1 illustrates the protocol stack for the user plane transport, related to a PDU
Session, including a 5G ProSe Layer 2 UE-to-Network Relay. The PDU layer corresponds to the
PDU carried between the 5G ProSe Layer-2 Remote UE and the Data Network (DN) over the
PDU session. The SDAP and PDCP protocols are specified in TS 38.300 [12]. PDCP end-to-end
connection is between the 5G ProSe Layer-2 Remote UE and NG-RAN. The functionality of the
adaptation layer is specified in TS 38.351 [28].
Editor's note: Whether the adaptation layer is supported over PC5 will be determined by
        RAN WG2.
    [FIG. 6.1.2.3.2-1 of 3GPP TS 23.304 V17.0.0, entitled "End-to-End User Plane Stack for a 5G
    ProSe Remote UE using 5G ProSe Layer-2 UE-to-Network Relay", is reproduced as FIG. 7]
[...]
6.4       5G ProSe Direct Communication
[...]
6.4.3             Unicast mode 5G ProSe Direct Communication
6.4.3.1       Layer-2 link establishment over PC5 reference point
To perform unicast mode of ProSe Direct communication over PC5 reference point, the UE is
configured with the related information as described in clause 5.1.3.
FIG. 6.4.3.1-1 shows the layer-2 link establishment procedure for the unicast mode of ProSe
Direct communication over PC5 reference point.

Figure 8:
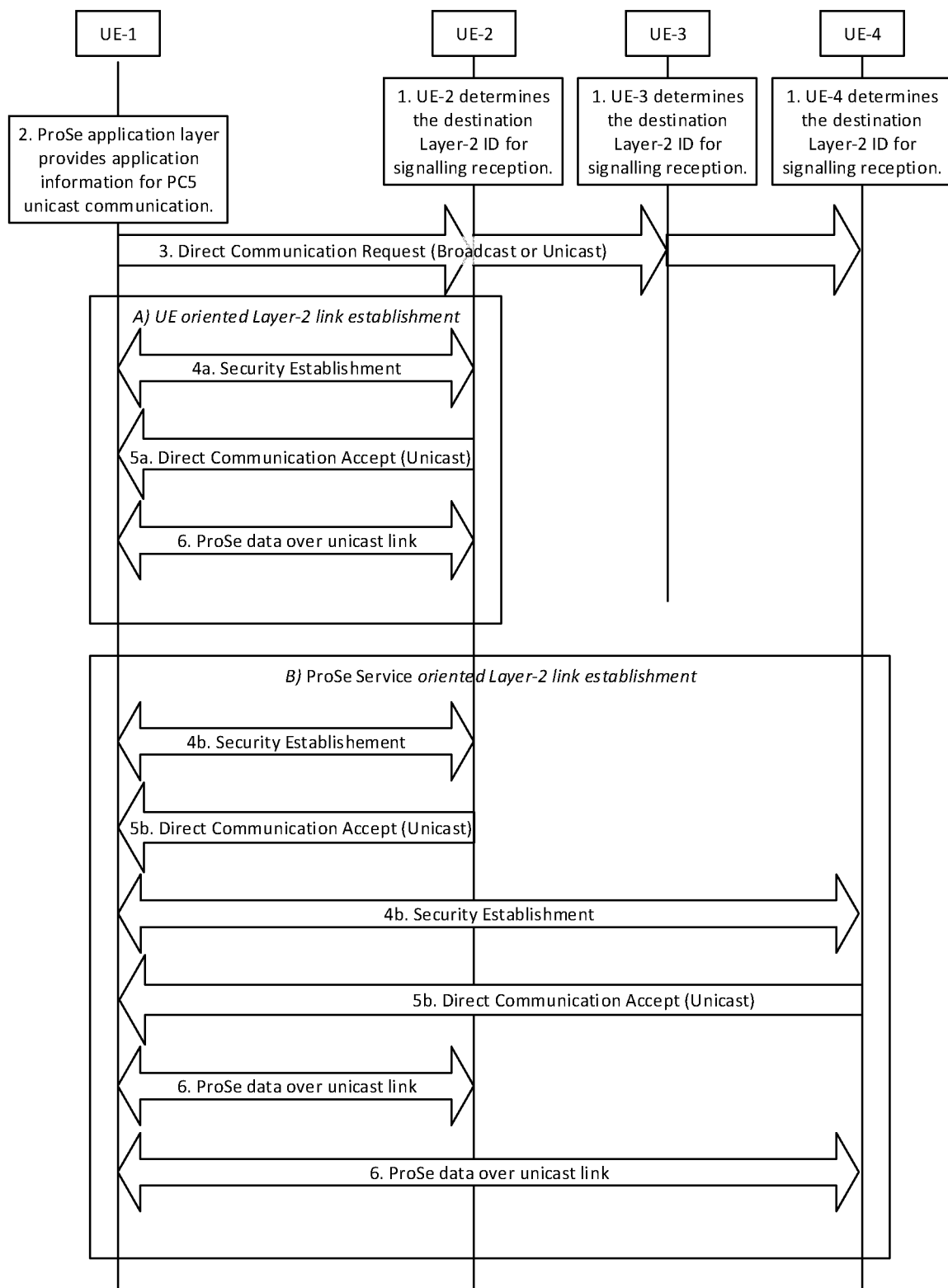
FIG. 8 is a reproduction of FIG. 6.4.3.1-1 of 3GPP TS 23.304 V17.0.0.

[FIG. 6.4.3.1-1 of 3GPP TS 23.304 V17.0.0, entitled "Layer-2 link establishment procedure", is reproduced as FIG. 8]

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QoS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-1's Application Layer ID).
   If the ProSe application layer provided the target UE's Application Layer ID in step 2, the following information is included:
      Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.
   NOTE 1: The Security Information and the necessary protection of the Source User Info and Target User Info are defined by SA WG3.
   The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
   UE-1 sends the Direct Communication Request message via PC5 broadcast or unicast using the source Layer-2 ID and the destination Layer-2 ID.
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.
   NOTE 2: The signalling for the Security Procedure is defined by SA WG3.
   When the security protection is enabled, UE-1 sends the following information to the target UE:
      If IP communication is used:
         IP Address Configuration: For IP communication, IP address configuration is required for this link and indicates one of the following values:
            "DHCPv4 server" if only IPv4 address allocation mechanism is supported by the initiating UE, i.e., acting as a DHCPv4 server; or
            "IPv6 Router" if only IPv6 address allocation mechanism is supported by the initiating UE, i.e., acting as an IPv6 Router; or
            "DHCPv4 server & IPv6 Router" if both IPv4 and IPv6 address allocation mechanism are supported by the initiating UE; or
            "address allocation not supported" if neither IPv4 nor IPv6 address allocation mechanism is supported by the initiating UE.
         Link-Local IPv6 Address: a link-local IPv6 address formed locally based on RFC 4862 [17] if UE-1 does not support the IPv6 IP address allocation mechanism, i.e. the IP Address Configuration indicates "address allocation not supported".
      QoS Info: the information about PC5 QoS Flow(s). For each PC5 QoS Flow, the PFI and the corresponding PC5 QoS parameters (i.e. PQI and conditionally other parameters such as MFBR/GFBR, etc.) and the associated ProSe identifier(s).
   The source Layer-2 ID used for the security establishment procedure is determined as specified in clauses 5.8.2.1 and 5.8.2.4. The destination Layer-2 ID is set to the source Layer-2 ID of the received Direct Communication Request message.
   Upon receiving the security establishment procedure messages, UE-1 obtains the peer UE's Layer-2 ID for future communication, for signalling and data traffic for this unicast link.
5. A Direct Communication Accept message is sent to UE-1 by the target UE(s) that has successfully established security with UE-1:
   5a. (UE oriented Layer-2 link establishment) If the Target User Info is included in the Direct Communication Request message, the target UE, i.e. UE-2 responds with a Direct Communication Accept message if the Application Layer ID for UE-2 matches.
   5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.3.3.1-1).
   The Direct Communication Accept message includes:
      Source User Info: Application Layer ID of the UE sending the Direct Communication Accept message.
      QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc) and the associated ProSe identifiers(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 [17] if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:

The PC5 Link Identifier and PFI are provided to the AS layer, together with the ProSe data. Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[...]

6.4.3.6  Layer-2 link management over PC5 reference point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

Editor's note: Whether the Layer-2 link modification procedure is also applicable to ProSe Communication via 5G ProSe Layer-2 UE-to-Network Relay requires cooperation with RAN2.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1, In step 1, the 5G ProSe Remote UE determines the destination Layer-2 ID for PC5 unicast link establishment based on the unicast source Layer-2 ID of the selected 5G ProSe UE-to-Network relay (as specified in clause 5.8.3) during UE-to-Network Relay discovery as specified in clause 6.3.2.3.

In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.

In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:

Source User Info: the identity of the Remote UE requesting relay operation.

Target User Info: the identity of the UE-to-Network Relay provided to the 5G ProSe Remote UE during UE-to-Network Relay Discovery procedure.

Relay Service Code: indicates the connectivity service provided by the 5G ProSe UE-to-Network Relay as requested by the 5G ProSe Remote UE.

Security Information: the information for the establishment of security.

In step 4 and step 5, step 4a and step 5a are performed if the 5G ProSe UE-to-Network Relay's identity matches the identity provided in the Target User Info and the Relay Service Code is one of the Relay Service Codes included during UE-to-Network Relay discovery as specified in clause 6.3.2.3.. The Source User Info in the Direct Communication Accept message is the identity of the UE-to-Network Relay. In case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In case of 5G ProSe Layer-3 UE-to-Network Relay, the Direct Communication Accept message does not include the IP Address Configuration indicating the value "address allocation not supported".

In case of 5G ProSe Layer-2 UE-to-Network Relay, step 6 is not performed.

For the Layer-2 link release as described in the clause 6.4.3.3,

In step1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE: The form of the temporarily not available indication will be determined by stage 3.

If the service authorization for acting as a 5G ProSe Remote UE or as a 5G ProSe UE-to-Network Relay is revoked, the 5G ProSe UE-to-Network Relay should initiate the release of the layer-2 link that the revoked authorization affects.

For the Layer-2 link modification as described in the clause 6.4.3.4,

In step1, the Layer-2 link modification procedure may be initiated by the 5G ProSe Layer-3 Remote UE based on the application information received from its ProSe application layer. The Link Modification Request message may include the PC5 QoS Rule(s) for the PC5 QoS Flow(s) to be added or modified as described in clause 5.6.2.1. The Layer-2 link modification procedure may be initiated by the 5G ProSe Layer-3 UE-to-Network Relay based on the information received from the SMF via NAS signalling from SMF.

A 5G ProSe Remote UE and a 5G ProSe UE-to-Network Relay shall set up a separate PC5 unicast links if an existing unicast link(s) was established with a different Relay Service Code or without a Relay Service Code.

3GPP TS 38.331 introduced the following:

5.2.2.3.3 Request for on demand system information

The UE shall:

1> if SIB1 includes si-SchedulingInfo containing si-RequestConfigSUL and criteria to select supplementary uplink as defined in TS 38.321[13], clause 5.1.1 is met:

[...]

1> else if SIB1 includes si-SchedulingInfo containing si-RequestConfig and criteria to select normal uplink as defined in TS 38.321[13], clause 5.1.1 is met:

[...]

1> else:

2> apply the default L1 parameter values as specified in corresponding physical layer specifications except for the parameters for which values are provided in SIB1;

2> apply the default MAC Cell Group configuration as specified in 9.2.2;

2> apply the timeAlignmentTimerCommon included in SIB1;

2> apply the CCCH configuration as specified in 9.1.1.2;

2> initiate transmission of the RRCSystemInfoRequest message in accordance with 5.2.23.4;

2> if acknowledgement for RRCSystemInfoRequest message is received from lower layers:

3> acquire the requested SI message(s) as defined in sub-clause 5.2.23.2, immediately;

1> if cell reselection occurs while waiting for the acknowledgment for SI request from lower layers:

2> reset MAC;

2> if SI request is based on RRCSystemInfoRequest message:

3> release RLC entity for SRB0.

[...]

5.3.3 RRC connection establishment 5.3.3.1 General

Figure 5:
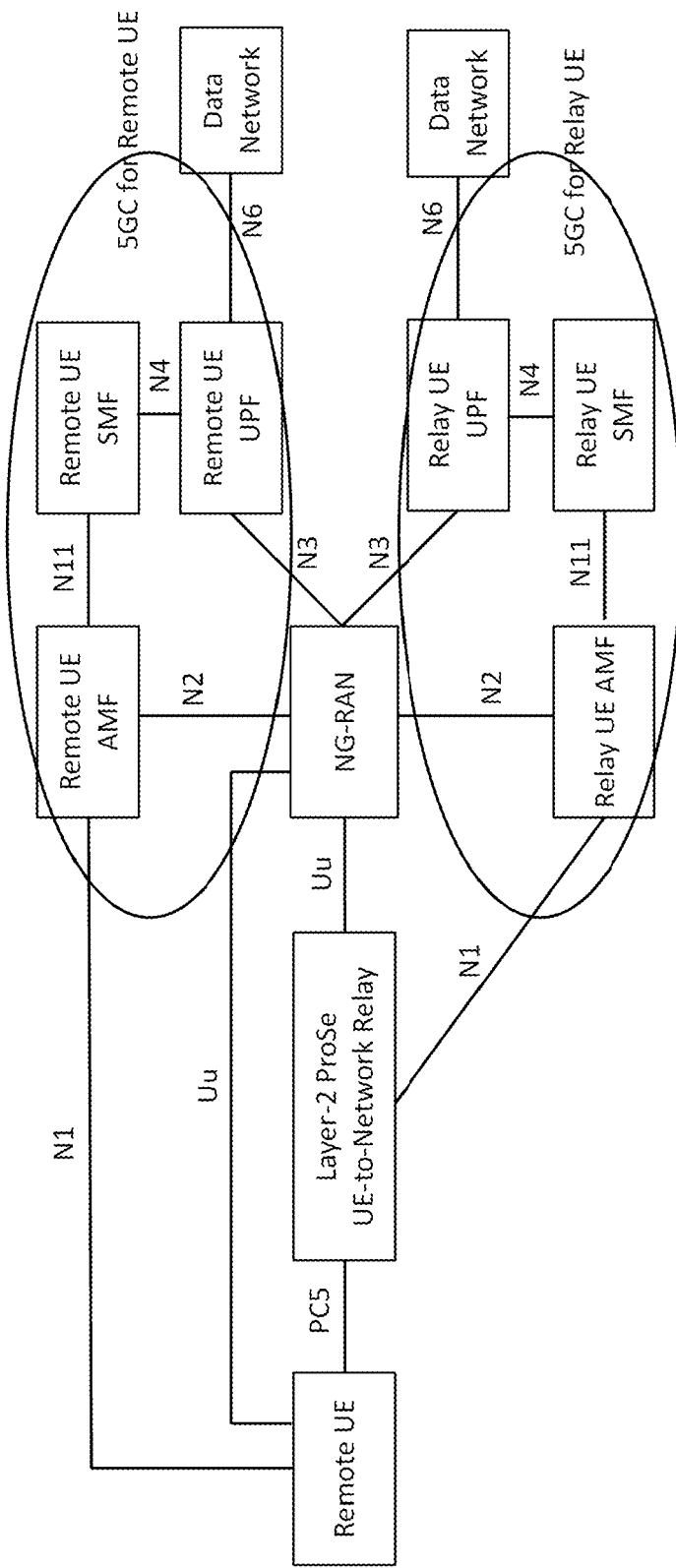
FIG. 5 is a reproduction of FIG. 4.2.7.2-1 of 3GPP TS 23.304 V17.0.0.
Figure 9:
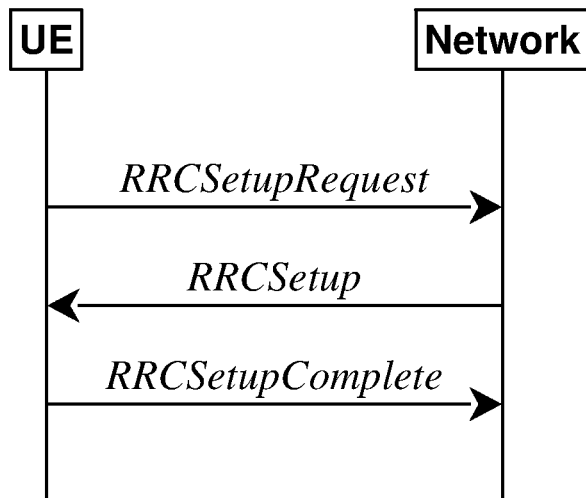
FIG. 9 is a reproduction of FIG. 5.3.3.1-1 of 3GPP TS 38.331 V16.6.0.

[FIG. 5.3.3.1-1 of 3GPP TS 38.331 V16.6.0, entitled "RRC connection establishment, successful", is reproduced as FIG. 9]

[...]

The purpose of this procedure is to establish an RRC connection. RRC connection establishment involves SRB1 establishment. The procedure is also used to transfer the initial NAS dedicated information/ message from the UE to the network.

The network applies the procedure e.g.as follows:

When establishing an RRC connection;

When UE is resuming or re-establishing an RRC connection, and the network is not able to retrieve or verify the UE context. In this case, UE receives RRCSetup and responds with RRCSetupComplete.

-continued

Figure 10:
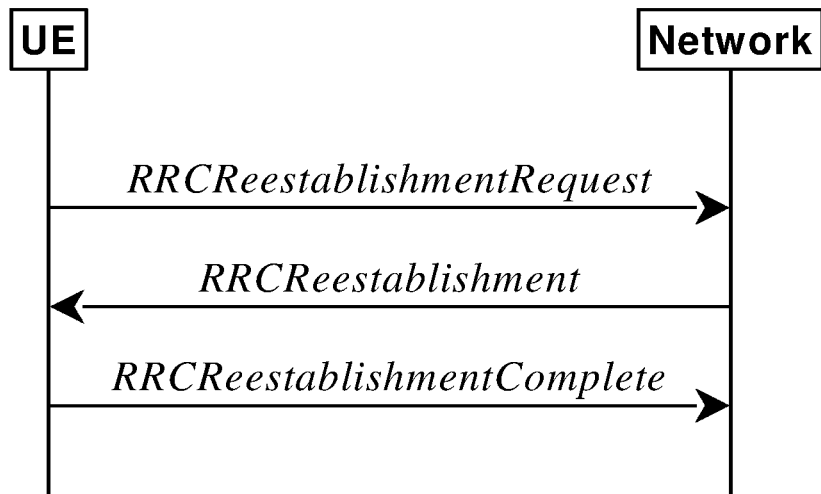
FIG. 10 is a reproduction of FIG. 5.3.7.1-1 of 3GPP TS 38.331 V16.6.0.

[...]
5.3.7 RRC connection re-establishment
5.3.7.1 General
[FIG. 5.3.7.1-1 of 3GPP TS 38.331 V16.6.0, entitled "RRC connection re-establishment, successful", is reproduced as FIG. 10]
[...]
The purpose of this procedure is to re-establish the RRC connection. A UE in RRC_CONNECTED, for which AS security has been activated with SRB2 and at least one DRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.
The network applies the procedure e.g as follows:
    When AS security has been activated and the network retrieves or verifies the UE context
      to re-activate AS security without changing algorithms;
      to re-establish and resume the SRB1;
    When UE is re-establishing an RRC connection, and the network is not able to retrieve or verify the UE context:
      to discard the stored AS Context and release all RBs and BH RLC channels;
      to fallback to establish a new RRC connection.
If AS security has not been activated, the UE shall not initiate the procedure but instead moves to RRC_IDLE directly, with release cause 'other'. If AS security has been activated, but SRB2 and at least one DRB or, for IAB, SRB2, are not setup, the UE does not initiate the procedure but instead moves to RRC_IDLE directly, with release cause 'RRC connection failure'.
5.3.7.2 Initiation
The UE initiates the procedure when one of the following conditions is met:
  1> upon detecting radio link failure of the MCG and t316 is not configured, in accordance with 5.3.10; or
  1> upon detecting radio link failure of the MCG while SCG transmission is suspended, in accordance with 5.3.10; or
  1> upon detecting radio link failure of the MCG while PSCell change or PSCell addition is ongoing, in accordance with 5.3.10; or
  1> upon re-configuration with sync failure of the MCG, in accordance with sub-clause 5.3.5.8.3; or
  1> upon mobility from NR failure, in accordance with sub-clause 5.4.3.5; or
  1> upon integrity check failure indication from lower layers concerning SRB1 or SRB2, except if the integrity check failure is detected on the RRCReestablishment message; or
  1> upon an RRC connection reconfiguration failure, in accordance with sub-clause 5.3.5.8.2; or
  1> upon detecting radio link failure for the SCG while MCG transmission is suspended, in accordance with subclause 5.3.10.3 in NR-DC or in accordance with TS 36.331 [10] subclause 5.3.11.3 in NE-DC; or
  1> upon reconfiguration with sync failure of the SCG while MCG transmission is suspended in accordance with subclause 5.3.5.8.3; or
  1> upon SCG change failure while MCG transmission is suspended in accordance with TS 36.331 [10] subclause 5.3.5.7a; or
  1> upon SCG configuration failure while MCG transmission is suspended in accordance with subclause 5.3.5.8.2 in NR-DC or in accordance with TS 36.331 [10] subclause 5.3.5.5 in NE-DC; or
  1> upon integrity check failure indication from SCG lower layers concerning SRB3 while MCG is suspended; or
  1> upon T316 expiry, in accordance with sub-clause 5.7.3b.5.
Upon initiation of the procedure, the UE shall:
  1> stop timer T310, if running;
  1> stop timer T312, if running;
  1> stop timer T304, if running;
  1> start timer T311;
  1> stop timer T316, if running;
  1> if U E is not configured with conditional Reconfiguration:
    2> reset MAC;
    2> release spCellConfig, if configured;
    2> suspend all RBs, and BH RLC channels for IAB-MT, except SRB0;
    2> release the MCG SCell(s), if configured;
    2> if MR-DC is configured:
      3> perform MR-DC release, as specified in clause 5.3.5.10;
    2> release delayBudgetReportingConfig, if configured and stop timer T342, if running;
    2> release overheatingAssistanceConfig, if configured and stop timer T345, if running;
    2> release idc-AssistanceConfig, if configured;
    2> release btNameList, if configured;
    2> release wlanNameList, if configured;
    2> release sensorNameList, if configured;
    2> release drx-PreferenceConfig for the MCG, if configured and stop timer T346a associated with the MCG, if running;
    2> release maxBW-PreferenceConfig for the MCG, if configured and stop timer T346b associated with the MCG, if running;
    2> release maxCC-PreferenceConfig for the MCG, if configured and stop timer T346c associated with the MCG, if running;
    2> release maxMIMO-LayerPreferenceConfig for the MCG, if configured and stop timer T346d associated with the MCG, if running;

2> release minSchedulingOffsetPreferenceConfig for the MCG, if configured stop timer
      T346e associated with the MCG, if running;
   2> release releasePreferenceConfig, if configured stop timer T346f, if running;
   2> release onDemandSIB-Reguest if configured, and stop timer T350, if running;
   2> release referenceTimePreferenceReporting, if configured;
   2> release sl-AssistanceConfigNR, if configured;
   2> release obtainCommonLocation, if configured;
1> if any DAPS bearer is configured:
   2> reset the source MAC and release the source MAC configuration;
   2> for each DAPS bearer:
      3> release the RLC entity or entities as specified in TS 38.322 [4], clause 5.1.3, and the
         associated logical channel for the source SpCell;
      3> reconfigure the PDCP entity to release DAPS as specified in TS 38.323 [5];
   2> for each SRB:
      3> release the PDCP entity for the source SpCell;
      3> release the RLC entity as specified in TS 38.322 [4], clause 5.1.3, and the associated
         logical channel for the source SpCell;
   2> release the physical channel configuration for the source SpCell;
   2> discard the keys used in the source SpCell (the $K_{gNB}$ key, the $K_{RRCenc}$ key, the $K_{RRCint}$ key,
      the $K_{UPint}$ key and the $K_{UPenc}$ key), if any;
1> perform cell selection in accordance with the cell selection process as specified in TS
   38.304 [20].
5.3.7.3      Actions following cell selection while T311 is running
Upon selecting a suitable NR cell, the UE shall:
   1> ensure having valid and up to date essential system information as specified in clause
      5.2.2.2;
   1> stop timer T311;
   1> if T390 is running:
      2> stop timer T390 for all access categories;
      2> perform the actions as specified in 5.3.14.4;
   1> if the cell selection is triggered by detecting radio link failure of the MCG or re-
      configuration with sync failure of the MCG or mobility from NR failure, and
   1> if attemptCondReconfig is configured; and
   1> if the selected cell is one of the candidate cells for which the reconfigurationWithSync is
      included in the masterCellGroup in VarConditionalReconfig:
      2> apply the stored condRRCReconfig associated to the selected cell and perform actions
         as specified in 5.3.5.3;
   NOTE 1: It is left to network implementation to how to avoid keystream reuse in case of CHO
           based recovery after a failed handover without key change.
   1> else:
      2> if UE is configured with conditionalReconfiguration:
         3> reset MAC;
         3> release spCellConfig, if configured;
         3> release the MCG SCell(s), if configured;
         3> release delayBudgetReportingConfig, if configured and stop timer T342, if running;
         3> release overheatingAssistanceConfig, if configured and stop timer T345, if running;
         3> if MR-DC is configured:
            4> perform MR-DC release, as specified in clause 5.3.5.10;
         3> release idc-AssistanceConfig, if configured;
         3> release btNameList, if configured;
         3> release wianNameList, if configured;
         3> release sensorNameList, if configured;
         3> release drx-PreferenceConfig for the MCG, if configured and stop timer T346a
            associated with the MCG, if running;
         3> release maxBW-PreferenceConfig for the MCG, if configured and stop timer T346b
            associated with the MCG, if running;
         3> release maxCC-PreferenceConfig for the MCG, if configured and stop timer T346c
            associated with the MCG, if running;
         3> release maxMIMO-LayerPreferenceConfig for the MCG, if configured and stop timer
            T346d associated with the MCG, if running;
         3> release minSchedulingOffsetPreferenceConfig for the MCG, if configured and stop
            timer T346e associated with the MCG, if running;
         3> release releasePreferenceConfig, if configured and stop timer T346f, if running;
         3> release onDemandSIB-Reguest if configured, and stop timer T350, if running;
         3> release referenceTimePreferenceReporting, if configured;
         3> release sl-AssistanceConfigNR, if configured;
         3> release obtainCommonLocation, if configured;
         3> suspend all RBs, except SRB0;
      2> remove all the entries within VarConditionalReconfig, if any;
      2> for each measid, if the associated reportConfig has a reportType set to
         condTriggerConfig:
         3> for the associated reportConfigId:
            4> remove the entry with the matching reportConfigId from the reportConfigList
               within the VarMeasConfig;
         3> if the associated measObjectId is only associated to a reportConfig with reportType
            set to condTriggerConfig:
            4> remove the entry with the matching measObjectId from the measObjectList
               within the VarMeasConfig;

3> remove the entry with the matching measId from the measIdList within the VarMeasConfig;
2> start timer T301;
2> apply the default L1 parameter values as specified in corresponding physical layer specifications except for the parameters for which values are provided in SIB1;
2> apply the default MAC Cell Group configuration as specified in 9.2.2;
2> apply the CCCH configuration as specified in 9.1.1.2;
2> apply the timeAlignmentTimerCommon included in SIB1;
2> initiate transmission of the RRCReestablishmentReguest message in accordance with 5.3.7.4;
NOTE 2: This procedure applies also if the UE returns to the source PCell.
Upon selecting an inter-RAT cell, the UE shall:
1> perform the actions upon going to RRC_IDLE as specified in 5.3.11, with release cause 'RRC connection failure'.

5.3.7.4   Actions related to transmission of RRCReestablishmentRequest message

The UE shall set the contents of RRCReestablishmentReguest message as follows:
1> if the procedure was initiated due to radio link failure as specified in 5.3.10.3 or reconfiguration with sync failure as specified in 5.3.5.8.3:
2> set the reestablishmentCellId in the VarRLF-Report to the global cell identity of the selected cell;
1> set the ue-Identity as follows:
2> set the c-RNTI to the C-RNTI used in the source PCell (reconfiguration with sync or mobility from NR failure) or used in the PCell in which the trigger for the re-establishment occurred (other cases);
2> set the physCellId to the physical cell identity of the source PCell (reconfiguration with sync or mobility from NR failure) or of the PCell in which the trigger for the re-establishment occurred (other cases);
2> set the shortMAC-I to the 16 least significant bits of the MAC- calculated:
3> over the ASN.1 encoded as per clause 8 (i.ea multiple of 8 bits) VarShortMAC-input;
3> with the KRRCint key and integrity protection algorithm that was used in the source PCell (reconfiguration with sync or mobility from NR failure) or of the PCell in which the trigger for the re-establishment occurred (other cases); and
3> with all input bits for COUNT, BEARER and DIRECTION set to binary ones;
1> set the reestablishmentCause as follows:
2> if the re-establishment procedure was initiated due to reconfiguration failure as specified in 5.3.5.8.2:
3> set the reestablishmentCause to the value reconfigurationFailure;
2> else if the re-establishment procedure was initiated due to reconfiguration with sync failure as specified in 5.3.5.8.3 (intra-NR handover failure) or 5.4.3.5 (inter-RAT mobility from NR failure):
3> set the reestablishmentCause to the value handoverFailure;
2> else:
3> set the reestablishmentCause to the value otherFailure;
1> re-establish PDCP for SRB1;
1> re-establish RLC for SRB1;
1> apply the default configuration defined in 9.2.1 for SRB1;
1> configure lower layers to suspend integrity protection and ciphering for SRB1;
NOTE: Ciphering is not applied for the subsequent RRCReestablishment message used to resume the connection. An integrity check is performed by lower layers, but merely upon request from RRC.
1> resume SRB1;
1> submit the RRCReestablishmentRequest message to lower layers for transmission.

5.3.7.5   Reception of the RRCReestablishment by the UE

Figure 11:
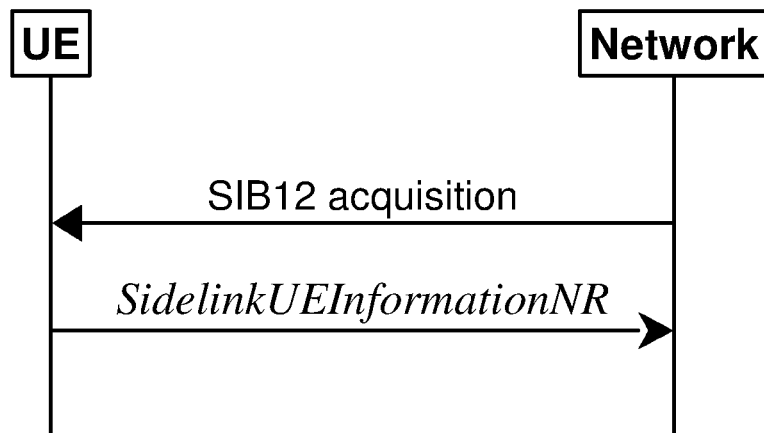
FIG. 11 is a reproduction of FIG. 5.8.3.1-1 of 3GPP TS 38.331 V16.6.0.
Figure 12:
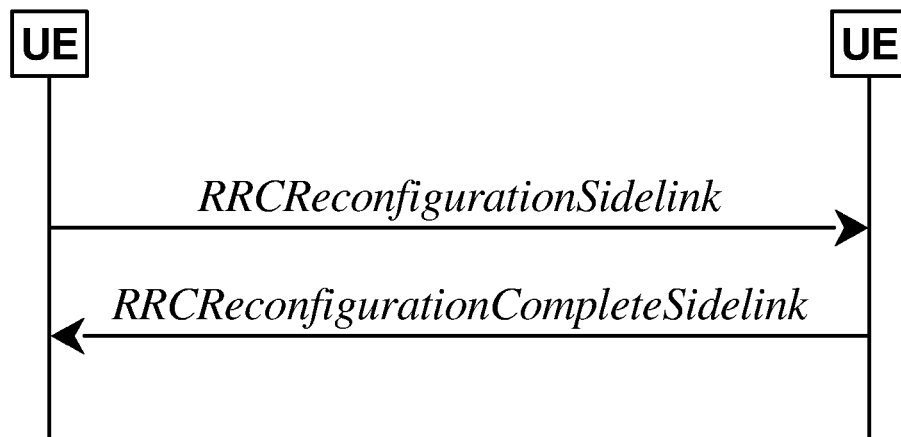
FIG. 12 is a reproduction of FIG. 5.8.9.1.1-1 of 3GPP TS 38.331 V16.6.0.

The UE shall:
1> stop timer T301;
1> consider the current cell to be the PCell;
1> store the nextHopChainingCount value indicated in the RRCReestablishment message;
1> update the $K_{gNB}$ key based on the current $K_{gNB}$ key or the NH, using the stored nextHopChainingCount value, as specified in TS 33.501 [11];
1> derive the $K_{RRCenc}$ and $K_{UPenc}$ keys associated with the previously configured cipheringAlgorithm, as specified in TS 33.501 [11];
1> derive the $K_{RRCint}$ and $K_{UPint}$ keys associated with the previously configured integrityProtAlgorithm, as specified in TS 33.501 [11].
1> request lower layers to verify the integrity protection of the RRCReestablishment message, using the previously configured algorithm and the $K_{RRCint}$ key;
1> if the integrity protection check of the RRCReestablishment message fails:
2> perform the actions upon going to RRC_IDLE as specified in 5.3.11, with release cause 'RRC connection failure', upon which the procedure ends;
1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;
1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;

1> release the measurement gap configuration indicated by the measGapConfig, if configured;
1> set the content of RRCReestablishmentComplete message as follows:
  2> if the UE has logged measurements available for NR and if the RPLMN is included in plmn-IdentityList stored in VarLogMeasReport:
    3> include the logMeasAvailable in the RRCReestablishmentComplete message;
    3> if Bluetooth measurement results are included in the logged measurements the UE has available for NR:
      4> include the logMeasAvailableBT in the RRCReestablishmentComplete message;
    3> if WLAN measurement results are included in the logged measurements the UE has available for NR:
      4> include the logMeasAvailableWLAN in the RRCReestablishmentComplete message;
  2> if the UE has connection establishment failure or connection resume failure information available in VarConnEstFailReport and if the RPLMN is equal to plmn-identity stored in VarConnEstFailReport:
    3> include connEstFailInfoAvailable in the RRCReestablishmentComplete message;
  2> if the UE has radio link failure or handover failure information available in VarRLF-Report and if the RPLMN is included in plmn-IdentityList stored in VarRLF-Report; or
  2> if the UE has radio link failure or handover failure information available in VarRLF-Report of TS 36.331 [10] and if the UE is capable of cross-RAT RLF reporting and if the RPLMN is included in plmn-IdentityList stored in VarRLF-Report of TS 36.331 [10]:
    3> include rlf-InfoAvailable in the RRCReestablishmentComplete message;
1> submit the RRCReestablishmentComplete message to lower layers for transmission;
1> the procedure ends.
[...]
5.8.3     Sidelink UE information for NR sidelink communication
5.8.3.1       General
          [FIG. 5.8.3.1-1 of 3GPP TS 38.331 V16.6.0, entitled "Sidelink UE information for NR sidelink communication", is reproduced as FIG. 11]
The purpose of this procedure is to inform the network that the UE:
    is interested or no longer interested to receive or transmit NR sidelink communication,
    is requesting assignment or release of transmission resource for NR sidelink communication,
    is reporting QoS parameters and QoS profile(s) related to NR sidelink communication,
    is reporting that a sidelink radio link failure or sidelink RRC reconfiguration failure has been detected,
    is reporting the sidelink UE capability information of the associated peer UE for unicast communication,
    is reporting the RLC mode information of the sidelink data radio bearer(s) received from the associated peer UE for unicast communication.
5.8.3.2       Initiation
A UE capable of NR sidelink communication that is in RRC_CONNECTED may initiate the procedure to indicate it is (interested in) receiving or transmitting NR sidelink communication in several cases including upon successful connection establishment or resuming, upon change of interest, upon changing QoS profiles, upon receiving UECapabilityInformationSidelink from the associated peer UE, upon RLC mode information updated from the associated peer UE or upon change to a PCell providing SIB12 including sl-ConfigCommonNR. A UE capable of NR sidelink communication may initiate the procedure to request assignment of dedicated sidelink DRB configuration and transmission resources for NR sidelink communication transmission. A UE capable of NR sidelink communication may initiate the procedure to report to the network that a sidelink radio link failure or sidelink RRC reconfiguration failure has been declared.
Upon initiating this procedure, the UE shall:
  1> if SIB12 including sl-ConfigCommonNR is provided by the PCell:
    2> ensure having a valid version of SIB12 for the PCell;
    2> if configured by upper layers to receive NR sidelink communication on the frequency included in sl-FreqInfoList in SIB12 of the PCell:
      3> if the UE did not transmit a SidelinkUEInformationNR message since last entering RRC_CONNECTED state; or
      3> if since the last time the UE transmitted a SidelinkUEInformationNR message the UE connected to a PCell not providing SIB12 including sl-ConfigCommonNR; or
      3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:
        4> initiate transmission of the SidelinkUEInformationNR message to indicate the NR sidelink communication reception frequency of interest in accordance with 5.8.3.3;
    2> else:
      3> if the last transmission of the SidelinkUEInformationNR message included sl-RxInterestedFreqList:
        4> initiate transmission of the SidelinkUEInformationNR message to indicate it is no longer interested in NR sidelink communication reception in accordance with 5.8.3.3;
    2> if configured by upper layers to transmit NR sidelink communication on the frequency included in sl-FreqInfoList in SIB12 of the PCell:
      3> if the UE did not transmit a SidelinkUEInformationNR message since last entering RRC_CONNECTED state; or 3> if since the last time the UE transmitted a SidelinkUEInformationNR message the UE
        connected to a PCell not providing SIB12 including sl-ConfigCommonNR; or
    3> if the last transmission of the SidelinkUEInformationNR message did not include sl-
        TxResourceReqList; or if the information carried by the sl-TxResourceReqList has
        changed since the last transmission of the SidelinkUEInformationNR message:
        4> initiate transmission of the SidelinkUEInformationNR message to indicate the NR
            sidelink communication transmission resources required by the UE in accordance
            with 5.8.3.3;
 2> else:
    3> if the last transmission of the SidelinkUEInformationNR message included sl-
        TxResourceReqList:
        4> initiate transmission of the SidelinkUEInformationNR message to indicate it no
            longer requires NR sidelink communication transmission resources in accordance
            with 5.8.3.3.
5.83.3      Actions related to transmission of SidelinkUEInformationNR
            message
The UE shall set the contents of the SidelinkUEInformationNR message as follows:
 1> if the UE initiates the procedure to indicate it is (no more) interested to receive NR
    sidelink communication or to request (configuration/release) of NR sidelink
    communication transmission resources or to report to the network that a sidelink radio
    link failure or sidelink RRC reconfiguration failure has been declared (i.e. UE includes all
    concerned information, irrespective of what triggered the procedure):
    2> if SIB12 including sl-ConfigCommonNR is provided by the PCell:
        3> if configured by upper layers to receive NR sidelink communication:
            4> include sl-RxInterestedFreqList and set it to the frequency for NR sidelink
                communication reception;
        3> if configured by upper layers to transmit NR sidelink communication:
            4> include sl-TxResourceReqList and set its fields (if needed) as follows for each
                destination for which it requests network to assign NR sidelink communication
                resource:
                5> set sl-DestinationIdentity to the destination identity configured by upper layer
                    for NR sidelink communication transmission;
                5> set sl-CastType to the cast type of the associated destination identity
                    configured by the upper layer for the NR sidelink communication
                    transmission;
                5> set sl-RLC-ModeIndication to include the RLC mode(s) and optionally QoS
                    profile(s) of the sidelink QoS flow(s) of the associated RLC mode(s), if the
                    associated bi-directional sidelink DRB has been established due to the
                    configuration by RRCReconfigurationSidelink;
                5> set sl-QoS-InfoList to include QoS profile(s) of the sidelink QoS flow(s) of the
                    associated destination configured by the upper layer for the NR sidelink
                    communication transmission;
                5> set sl-InterestedFreqList to indicate the frequency of the associated
                    destination for NR sidelink communication transmission;
                5> set sl-TypeTxSyncList to the current synchronization reference type used on
                    the associated sl-InterestedFreqList for NR sidelink communication
                    transmission.
                5> set sl-CapabilityInformationSidelink to include
                    UECapabilityInformationSidelink message, if any, received from peer UE.
            4> if a sidelink radio link failure or a sidelink RRC reconfiguration failure has been
                declared, according to clauses 5.8.9.3 and 5.8.9.1.8, respectively;
                5> include sl-FailureList and set its fields as follows for each destination for which
                    it reports the NR sidelink communication failure:
                    6> set sl-DestinationIdentity to the destination identity configured by upper
                        layer for NR sidelink communication transmission;
                    6> if the sidelink RLF is detected as specified in sub-clause 5.8.9.3:
                        7> set si-Failure as rlf for the associated destination for the NR sidelink
                            communication transmission;
                    6> else if RRCReconfigurationFailureSidelink is received:
                        7> set si-Failure as configFailure for the associated destination for the NR
                            sidelink communication transmission;
 1> if the UE initiates the procedure while connected to an E-UTRA PCell:
    2> submit the SidelinkUEInformationNR to lower layers via SRB1, embedded in E-UTRA
        RRC message ULInformationTransferIRATas specified in TS 36.331 [10], clause 5.6.28;
 1> else:
    2> submit the SidelinkUEInformationNR message to lower layers for transmission.
[...]
5.8.9       Sidelink RRC procedure
5.8.9.1         Sidelink RRC reconfiguration
5.8.9.1.1           General
        [FIG. 5.8.9.1.1-1 of 3GPP TS 38.331 V16.6.0, entitled "Sidelink RRC reconfiguration,
                            successful", is reproduced as FIG. 12]
[...]
The purpose of this procedure is to modify a PC5-RRC connection, e.g. to
establish/modify/release sidelink DRBs, to (re-)configure NR sidelink measurement and
reporting, to (re-)configure sidelink CSI reference signal resources and CSI reporting latency
bound.

-continued

The UE may initiate the sidelink RRC reconfiguration procedure and perform the operation in
sub-clause 5.8.9.1.2 on the corresponding PC5-RRC connection in following cases:
    the release of sidelink DRBs associated with the peer UE, as specified in sub-clause
    5.8.9.1a.1;
    the establishment of sidelink DRBs associated with the peer UE, as specified in sub-clause
    5.8.9.1a.2;
    the modification for the parameters included in SLRB-Config of sidelink DRBs associated
    with the peer UE, as specified in sub-clause 5.8.9.1a.2;
    the (re-)configuration of the peer UE to perform NR sidelink measurement and report.
    the (re-)configuration of the sidelink CSI reference signal resources and CSI reporting
    latency bound.
In RRC_CONNECTED, the UE applies the NR sidelink communications parameters provided in
RRCReconfiguration (if any). In RRC_IDLE or RRC_INACTIVE, the UE applies the NR sidelink
communications parameters provided in system information (if any). For other cases, UEs apply
the NR sidelink communications parameters provided in SidelinkPreconfigNR (if any). When UE
performs state transition between above three cases, the UE applies the NR sidelink
communications parameters provided in the new state, after acquisition of the new
configurations. Before acquisition of the new configurations, UE continues applying the NR
sidelink communications parameters provided in the old state.
5.8.9.1.2        Actions related to transmission of RRCReconfigurationSidelink
                message
The UE shall set the contents of RRCReconfigurationSidelink message as follows:
    1> for each sidelink DRB that is to be released, according to sub-clause 5.8.9.1a.1.1, due to
       configuration by sl-ConfigDedicatedNR, SIB12, SidelinkPreconfigNR or by upper layers:
       2> set the SLRB-PC5-ConfigIndex included in the slrb-ConfigToReleaseList corresponding
          to the sidelink DRB;
    1> for each sidelink DRB that is to be established or modified, according to sub-clause
       5.8.9.1a.2.1, due to receiving sl-ConfigDedicatedNR, SIB12 or SidelinkPreconfigNR:
       2> set the SLRB-Config included in the slrb-ConfigToAddModList, according to the received
          sl-RadioBearerConfig and sl-RLC-BearerConfig corresponding to the sidelink DRB;
    1> set the sl-MeasConfig as follows:
       2> If the frequency used for NR sidelink communication is included in sl-
          FreqInfoToAddModList in sl-ConfigDedicatedNR within RRCReconfiguration message or
          included in sl-ConfigCommonNR within SIB12:
          3> if UE is in RRC_CONNECTED:
             4> set the sl-MeasConfig according to stored NR sidelink measurement
                configuration information for this destination;
          3> if UE is in RRC_IDLE or RRC_INACTIVE:
             4> set the sl-MeasConfig according to stored NR sidelink measurement
                configuration received from SIB12;
       2> else:
          3> set the sl-MeasConfig according to the sl-MeasPreconfig in SidelinkPreconfigNR;
    1> start timer T400 for the destination associated with the sidelink DRB;
    1> set the sl-CSI-RS-Config;
    1> set the sl-LatencyBoundCSI-Report,
    NOTE 1: How to set the parameters included in sl-CSI-RS-Config and sl-LatencyBoundCSI-
           Report is up to UE implementation.
The UE shall submit the RRCReconfigurationSidelink message to lower layers for transmission.
5.8.9.1.3        Reception of an RRCReconfigurationSidelink by the UE
The UE shall perform the following actions upon reception of the RRCReconfigurationSidelink:
    1> if the RRCReconfigurationSidelink includes the sl-ResetConfig:
       2> perform the sidelink reset configuration procedure as specified in 5.8.9.1.10;
    1> if the RRCReconfigurationSidelink includes the slrb-ConfigToReleaseList:
       2> for each SLRB-PC5-ConfigIndex value included in the slrb-ConfigToReleaseList that is
          part of the current UE sidelink configuration;
          3> perform the sidelink DRB release procedure, according to sub-clause 5.8.9.1a.1;
    1> if the RRCReconfigurationSidelink includes the slrb-ConfigToAddModList:
       2> for each slrb-PC5-ConfigIndex value included in the slrb-ConfigToAddModList that is
          not part of the current UE sidelink configuration:
          3> if sl-MappedQoS-FlowsToAddList is included:
             4> apply the SL-PQFI included in sl-MappedQoS-FlowsToAddList;
          3> perform the sidelink DRB addition procedure, according to sub-clause 5.8.9.1a.2;
       2> for each slrb-PC5-ConfigIndex value included in the slrb-ConfigToAddModList that is
          part of the current UE sidelink configuration:
          3> if sl-MappedQoS-FlowsToAddList is included:
             4> add the SL-PQFI included in sl-MappedQoS-FlowsToAddList to the corresponding
                sidelink DRB;
          3> if sl-MappedQoS-FlowsToReleaseList is included:
             4> remove the SL-PQFI included in sl-MappedQoS-FlowsToReleaseList from the
                corresponding sidelink DRB;
          3> if the sidelink DRB release conditions as described in sub-clause 5.8.9.1a.1.1 are
            met:
             4> perform the sidelink DRB release procedure according to sub-clause 5.8.9.1a.1.2;
          3> else if the sidelink DRB modification conditions as described in sub-clause
            5.8.9.1a.2.1 are met:
             4> perform the sidelink DRB modification procedure according to sub-clause
                5.8.9.1a.2.2;

-continued

> 1> if the RRCReconfigurationSidelink message includes the sl-MeasConfig:
>> 2> perform the sidelink measurement configuration procedure as specified in 5.8.10;
> 1> if the RRCReconfigurationSidelink message includes the sl-CSI-RS-Config:
>> 2> apply the sidelink CSI-RS configuration;
> 1> if the RRCReconfigurationSidelink message includes the sl-LatencyBoundCSI-Report:
>> 2> apply the configured sidelink CSI report latency bound;
> 1> if the UE is unable to comply with (part of) the configuration included in the RRCReconfigurationSidelink (i.e. sidelink RRC reconfiguration failure):
>> 2> continue using the configuration used prior to the reception of the RRCReconfigurationSidelink message;
>> 2> set the content of the RRCReconfigurationFailureSidelink message;
>>> 3> submit the RRCReconfigurationFailureSidelink message to lower layers for transmission;
> 1> else:
>> 2> set the content of the RRCReconfigurationCompleteSidelink message;
>>> 3> submit the RRCReconfigurationCompleteSidelink message to lower layers for transmission;
> NOTE 1: When the same logical channel is configured with different RLC mode by another UE, the UE handles the case as sidelink RRC reconfiguration failure.

[...]

5.8.9.1a.3    Sidelink SRB release
The UE shall:
> 1> if a PC5-RRC connection release for a specific destination is requested by upper layers; or
> 1> if the sidelink radio link failure is detected for a specific destination:
>> 2> release the PDCP entity, RLC entity and the logical channel of the sidelink SRB for PC5-RRC message of the specific destination;
>> 2> consider the PC5-RRC connection is released for the destination.
> 1> if PC5-S transmission for a specific destination is terminated in upper layers:
>> 2> release the PDCP entity, RLC entity and the logical channel of the sidelink SRB(s) for PC5-S message of the specific destination;

5.8.9.1a.4    Sidelink SRB addition
The UE shall:
> 1> if transmission of PC5-S message for a specific destination is requested by upper layers for sidelink SRB:
>> 2> establish PDCP entity, RLC entity and the logical channel of a sidelink SRB for PC5-S message, as specified in sub-clause 9.1.1.4;
> 1> if a PC5-RRC connection establishment for a specific destination is indicated by upper layers:
>> 2> establish PDCP entity, RLC entity and the logical channel of a sidelink SRB for PC5-RRC message of the specific destination, as specified in sub-clause 9.1.1.4;
>> 2> consider the PC5-RRC connection is established for the destination.

[...]

5.8.9.3    Sidelink radio link failure related actions
The UE shall:
> 1> upon indication from sidelink RLC entity that the maximum number of retransmissions for a specific destination has been reached; or
> 1> upon T400 expiry for a specific destination; or
> 1> upon indication from MAC entity that the maximum number of consecutive HARQ DTX for a specific destination has been reached; or
> 1> upon integrity check failure indication from sidelink PDCP entity concerning SL-SRB2 or SL-SRB3 for a specific destination:
>> 2> consider sidelink radio link failure to be detected for this destination;
>> 2> release the DRBs of this destination, in according to sub-clause 5.8.9.1a.1;
>> 2> release the SRBs of this destination, in according to sub-clause 5.8.9.1a.3;
>> 2> discard the NR sidelink communication related configuration of this destination;
>> 2> reset the sidelink specific MAC of this destination;
>> 2> consider the PC5-RRC connection is released for the destination;
>> 2> indicate the release of the PC5-RRC connection to the upper layers for this destination (i.e. PC5 is unavailable);
>> 2> if UE is in RRC_CONNECTED:
>>> 3> perform the sidelink UE information for NR sidelink communication procedure, as specified in 5.8.3.3;
> NOTE: It is up to UE implementation on whether and how to indicate to upper layers to maintain the keep-alive procedure [55].

A running CR of TS 38.331 introduced the following:

Next Modified Subclause 5.3.7    RRC connection re-establishment
[...]
5.3.7.2    Initiation
The UE initiates the procedure when one of the following conditions is met:
> 1> upon detecting radio link failure of the MCG and t316 is not configured, in accordance with 5.3.10; or -continued 1> upon detecting radio link failure of the MCG while SCG transmission is suspended, in accordance with 5.3.10; or
1> upon detecting radio link failure of the MCG while PSCell change or PSCell addition is ongoing, in accordance with 5.3.10; or
1> upon re-configuration with sync failure of the MCG, in accordance with sub-clause 5.3.5.8.3; or
1> upon mobility from NR failure, in accordance with sub-clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with sub-clause 5.3.5.8.2; or
1> upon detecting radio link failure for the SCG while MCG transmission is suspended, in accordance with subclause 5.3.10.3 in NR-DC or in accordance with TS 36.331 [10] subclause 5.3.11.3 in NE-DC; or
1> upon reconfiguration with sync failure of the SCG while MCG transmission is suspended in accordance with subclause 5.3.5.8.3; or
1> upon SCG change failure while MCG transmission is suspended in accordance with TS 36.331 [10] subclause 5.3.5.7a; or
1> upon SCG configuration failure while MCG transmission is suspended in accordance with subclause 5.3.5.8.2 in NR-DC or in accordance with TS 36.331 [10] subclause 5.3.5.5 in NE-DC; or
1> upon integrity check failure indication from SCG lower layers concerning SRB3 while MCG is suspended; or
1> upon T316 expiry, in accordance with sub-clause 5.7.3b.5; or
1> upon detecting sidelink radio link failure by L2 U2N Remote UE in RRC_CONNECTED, in accordance with subclause 5.8.9.3.

Upon initiation of the procedure, the UE shall:
1> stop timer T310, if running;
1> stop timer T312, if running;
1> stop timer T304, if running;
1> start timer T311;
1> stop timer T316, if running;
1> if UE is not configured with conditionalReconfiguration:
 2> reset MAC;
 2> release spCellConfig, if configured;
 2> suspend all RBs, and BH RLC channels for IAB-MT, except SRB0;
 2> release the MCG SCell(s), if configured;
 2> if MR-DC is configured:
  3> perform MR-DC release, as specified in clause 5.3.5.10;
 2> release delayBudgetReportingConfig, if configured and stop timer T342, if running;
 2> release overheatingAssistanceConfig, if configured and stop timer T345, if running;
 2> release idc-AssistanceConfig, if configured;
 2> release btNameList, if configured;
 2> release wlanNameList, if configured;
 2> release sensorNameList, if configured;
 2> release drx-PreferenceConfig for the MCG, if configured and stop timer T346a associated with the MCG, if running;
 2> release maxBW-PreferenceConfig for the MCG, if configured and stop timer T346b associated with the MCG, if running;
 2> release maxCC-PreferenceConfig for the MCG, if configured and stop timer T346c associated with the MCG, if running;
 2> release maxMIMO-LayerPreferenceConfig for the MCG, if configured and stop timer T346d associated with the MCG, if running;
 2> release minSchedulingOffsetPreferenceConfig for the MCG, if configured stop timer T346e associated with the MCG, if running;
 2> release releasePreferenceConfig, if configured stop timer T346f, if running;
 2> release onDemandSIB-Request if configured, and stop timer T350, if running;
 2> release referenceTimePreferenceReporting, if configured;
 2> release sl-AssistanceConfigNR, if configured;
 2> release obtainCommonLocation, if configured;
1> if any DAPS bearer is configured:
 2> reset the source MAC and release the source MAC configuration;
 2> for each DAPS bearer:
  3> release the RLC entity or entities as specified in TS 38.322 [4], clause 5.1.3, and the associated logical channel for the source SpCell;
  3> reconfigure the PDCP entity to release DAPS as specified in TS 38.323 [5];
 2> for each SRB:
  3> release the PDCP entity for the source SpCell;
  3> release the RLC entity as specified in TS 38.322 [4], clause 5.1.3, and the associated logical channel for the source SpCell;
 2> release the physical channel configuration for the source SpCell;
 2> discard the keys used in the source SpCell (the $K_{gNB}$ key, the $K_{RRCenc}$ key, the $K_{RRCint}$ key, the $K_{UPint}$ key and the $K_{UPenc}$ key), if any;
1> if the UE connects with a L2 U2N Relay UE via PC5-RRC connection (i.e. the UE is a L2 U2N Remote UE):
 1> perform either cell selection in accordance with the cell selection process as specified in TS 38.304 [20], or relay selection as specified in clause 5.8.x3.3, or both;

1> else:
       2> perform cell selection in accordance with the cell selection process as specified in TS 38.304 [20].
[...]
5.3.7.3a      Actions following relay selection while [T311] is running
Upon selecting a suitable L2 U2N Relay UE, the L2 U2N Remote UE shall:
    1> ensure having valid and up to date essential system information as specified in clause 5.2.2.2;
    1> stop timer [T311];
    1> if T390 is running:
       2> stop timer T390 for all access categories;
       2> perform the actions as specified in 5.3.14.4;
    1> start timer [T301];
    1> initiate the PC5 unicast link establishment as specified in TS 23.304 [xl???];
    1> apply the specified configuration of SL-RLC0 as specified in 9.1.1.4;
    1> initiate transmission of the RRCReestablishmentRequest message in accordance with 5.3.7.4.
5.3.7.4      Actions related to transmission of RRCReestablishmentRequest message
The UE shall set the contents of RRCReestablishmentRequest message as follows:
    1> if the procedure was initiated due to radio link failure as specified in 5.3.10.3 or reconfiguration with sync failure as specified in 5.3.5.8.3:
       2> set the reestablishmentCellId in the VarRLF-Report to the global cell identity of the selected cell;
    1> set the ue-Identity as follows:
       2> set the c-RNTI to the C-RNTI used in the source PCell (reconfiguration with sync or mobility from NR failure) or used in the PCell in which the trigger for the re-establishment occurred (other cases);
       2> set the physCellId to the physical cell identity of the source PCell (reconfiguration with sync or mobility from NR failure) or of the PCell in which the trigger for the re-establishment occurred (other cases);
       2> set the shortMAC-I to the 16 least significant bits of the MAC-I calculated:
          3> over the ASN.1 encoded as per clause 8 (i.e., a multiple of 8 bits) VarShortMAC-input;
          3> with the $K_{RRCint}$ key and integrity protection algorithm that was used in the source PCell (reconfiguration with sync or mobility from NR failure) or of the PCell in which the trigger for the re-establishment occurred (other cases); and
          3> with all input bits for COUNT, BEARER and DIRECTION set to binary ones;
    1> set the reestablishmentCause as follows:
       2> if the re-establishment procedure was initiated due to reconfiguration failure as specified in 5.3.5.8.2:
          3> set the reestablishmentCause to the value reconfigurationFailure;
       2> else if the re-establishment procedure was initiated due to reconfiguration with sync failure as specified in 5.3.5.8.3 (intra-NR handover failure) or 5.4.3.5 (inter-RAT mobility from NR failure):
          3> set the reestablishmentCause to the value handoverFailure;
       2> else:
          3> set the reestablishmentCause to the value otherFailure;
    1> re-establish PDCP for SRB1;
    1> if the UE connects with a L2 U2N Relay UE via PC5-RRC connection (i.e. the UE is a L2 U2N Remote UE):
       2> apply the default configuration of SL-RLC1 as defined in 9.2.x for SRB1;
    1> else:
       2> re-establish RLC for SRB1;
       2> apply the default configuration defined in 9.2.1 for SRB1;
    1> configure lower layers to suspend integrity protection and ciphering for SRB1;
    NOTE: Ciphering is not applied for the subsequent RRCReestablishment message used to resume the connection. An integrity check is performed by lower layers, but merely upon request from RRC.
    1> resume SRB1;
    1> submit the RRCReestablishmentRequest message to lower layers for transmission.

Next Modified Subclause 5.8.9      Sidelink RRC procedure
5.8.9.1      Sidelink RRC reconfiguration
5.8.9.1.1      General
[...]
The purpose of this procedure is to modify a PC5-RRC connection, e.g. to establish/modify/release sidelink DRBs, to (re-)configure NR sidelink measurement and reporting, to (re-)configure sidelink CSI reference signal resources and CSI reporting latency bound.
The UE may initiate the sidelink RRC reconfiguration procedure and perform the operation in sub-clause 5.8.9.1.2 on the corresponding PC5-RRC connection in following cases:
    the release of sidelink DRBs associated with the peer UE, as specified in sub-clause 5.8.9.1a.1;
    the establishment of sidelink DRBs associated with the peer UE, as specified in sub-clause 5.8.9.1a.2;
    the modification for the parameters included in SLRB-Config of sidelink DRBs associated with the peer UE, as specified in sub-clause 5.8.9.1a.2;

the release of sidelink RLC bearers not associated with SL-PDCP for L2 U2N Relay UE and
Remote UE, as specified in sub-clause 5.8.9.x1.1;
the establishment of RLC bearers not associated with SL-PDCP for L2 U2N Relay UE and
Remote UE, as specified in sub-clause 5.8.9.x1.2;
the modification for the parameters included in SL-RLC-BearerConfig of RLC bearers not
associated with SL-PDCP for L2 U2N Relay UE and Remote UE, as specified in sub-clause
5.8.9.x1.2;
the (re-)configuration of the peer UE to perform NR sidelink measurement and report.
the (re-)configuration of the sidelink CSI reference signal resources and CSI reporting
latency bound.
In RRC_CONNECTED, the UE applies the NR sidelink communications parameters provided in
RRCReconfiguration (if any). In RRC_IDLE or RRC_INACTIVE, the UE applies the NR sidelink
communications parameters provided in system information (if any). For other cases, UEs apply
the NR sidelink communications parameters provided in SidelinkPreconfigNR (if any). When UE
performs state transition between above three cases, the UE applies the NR sidelink
communications parameters provided in the new state, after acquisition of the new
configurations. Before acquisition of the new configurations, UE continues applying the NR
sidelink communications parameters provided in the old state.

Next Modified Subclause 5.8.9.3         Sidelink radio link failure related actions
The UE shall:
   1> upon indication from sidelink RLC entity that the maximum number of retransmissions for
      a specific destination has been reached; or
   1> upon T400 expiry for a specific destination; or
   1> upon indication from MAC entity that the maximum number of consecutive HARQ DTX for
      a specific destination has been reached; or
   1> upon integrity check failure indication from sidelink PDCP entity concerning SL-SRB2 or SL-
      SRB3 for a specific destination:
      2> consider sidelink radio link failure to be detected for this destination;
      2> release the DRBs of this destination, in according to sub-clause 5.8.9.1a.1 if any;
      2> release the SRBs of this destination, in according to sub-clause 5.8.9.1a.3;
      2> release the sidelink RLC bearersnot associated with SL-PDCP of this destination, in
         according to sub-clause 5.8.9.x1.1;
      2> discard the NR sidelink communication related configuration of this destination;
      2> reset the sidelink specific MAC of this destination;
      2> consider the PC5-RRC connection is released for the destination;
      2> indicate the release of the PC5-RRC connection to the upper layers for this destination
         (i.e. PC5 is unavailable);
      2> if UE is in RRC_CONNECTED:
         3> perform the sidelink UE information for NR sidelink communication procedure, as
            specified in 5.8.3.3;
         3> if the UE connects with a L2 U2N Relay UE via PC5-RRC connection (i.e. the UE is a
            L2 U2N Remote UE):
            4> initiate the RRC connection re-establishment procedure as specified in 5.3.7.
   NOTE: It is up to UE implementation on whether and how to indicate to upper layers to
         maintain the keep-alive procedure [55].

Next Modified Subclause (New)

5.8.9.x1       Sidelink RLC bearer management for L2 U2N relay
5.8.9.x1.1      Sidelink RLC bearer release
The UE shall:
   1> for each sl-RLC-BearerConfigIndex included in the received sl-RLC-BearerToReleaseList
      that is part of the current UE sidelink configuration:
      2> release the RLC entity and the corresponding logical channel for NR sidelink
         communication, associated with the sl-RLC-BearerConfigIndex;
5.8.9.x1.2        Sidelink RLC bearer addition/modification
For each sl-RLC-BearerConfigIndex received in the sl-RLC-BearerToAddModList IE the UE shall:
   1> if the current configuration contains a sidelink RLC bearer with the received sl-RLC-
      BearerConfig Index:
      2> reconfigure the sidelink RLC entity or entities in accordance with the received sl-RLC-
         ConfigPC5;
      2> reconfigure the sidelink logical channel in accordance with the received sl-MAC-
         LogicalChannelConfigPC5;
   1> else (a sidelink RLC bearer with the received sl-RLC-BearerConfigIndex was not configured
      before):
      2> establish an sidelink RLC entity in accordance with the received sl-RLC-ConfigPC5;
      2> configure the sidelink MAC entity with a logical channel in accordance with the
         received sl-MAC-LogicalChannelConfigPC5.
Editor's Note:      RAN2 to further discuss whether new or existing PC-5 RRC message is used for
                     RRC_IDLE/RRC_INACTIVE Remote UE to provide 5G-S-TMSI/I-RNTI as well as
                     interested SIB type to Relay UE.
Editor's note:      FFS how to capture the case of Relay UE in RRC_CONNECTED for paging
                     monitoring.
Editor's Note:      RAN2 to further discuss whether new or existing PC-5 RRC message is used for
                     SI forwarding.

-continued

Next Modified Subclause 9.1.1.4    SCCH configuration
[...]
Parameters that are specified for NR sidelink L2 U2N Relay operations, which is used for the
sidelink RLC channel for Remote UE's SRB0 message transmission. The sidelink RLC bearer using
this configuration is named as SL-RLC0.

| Name | Value | Semantics description | Ver |
|---|---|---|---|
| RLC configuration | | AM | |
| >sn-FieldLength | 12 | | |
| >t-Reassembly | Undefined | Selected by the receving UE, up to UE implementation | |
| >logicalChannelIdentity | FFS | | |
| MAC configuration | | | |
| >priority | 1 | | |
| >proritisedBitRate | Inifinity | | |
| >logicalChannelGroup | 0 | | |

Next Modified Subclause 9.2.x    Default sidelink RLC bearer configuration
Parameters that are used for the sidelink RLC bearer for Remote UE's SRB1 RRC message such
as RRCResume and RRCReestablishment message. The sidelink RLC bearer using this
configuration is named as SL-RLC1.

| Name | Value | Semantics description | Ver |
|---|---|---|---|
| RLC configuration | | AM | |
| >sn-FieldLength | 12 | | |
| >t-Reassembly | Undefined | Selected by the receving UE, up to UE implementation | |
| >logicalChannelIdentity | FFS | | |
| MAC configuration | | | |
| >priority | 1 | | |
| >proritisedBitRate | Inifinity | | |
| >logicalChannelGroup | 0 | | |

According to 3GPP TS 23.304, 5G ProSe Layer-2 UE-to-Network Relay is introduced to provide the relaying functionality to support connectivity to the network for 5G ProSe Remote UEs. When a remote UE initiates a service having traffic toward to network, the remote UE should establish a unicast link or a PC5-S connection with a relay UE. Basically, the remote UE could send a Direct Communication Request message for requesting establishment of the unicast link to the relay UE with the remote UE's Layer 2 Identification (L2ID) as Source L2ID and the relay UE's L2ID as Destination L2ID. The relay UE can learn the remote UE's L2ID by receiving the Direct Communication Request message with the remote UE's L2ID as Source L2ID.

According to 3GPP TS 38.331, a procedure for sending SidelinkUEInformation message is introduced for UE to request gNB for assignment of transmission resource. For example, when UE1 establishes a unicast link with UE2 and UE1 is in RRC_CONNECTED, UE1 will send a first SidelinkUEInformation message (including UE2's L2ID in destination list) to gNB. According to the first SidelinkUEInformation message, gNB may then configure UE1 with PC5 AS configuration (e.g. Sidelink (SL) Data Radio Bearer (DRB) configuration, SL Service Data Adaptation Protocol (SDAP) configuration, SL RLC configuration, and/or etc.) for UE1 to perform sidelink communication with UE2.

3GPP TS 38.331 also introduces Sidelink RRC procedure for handling Sidelink Radio Link Failure (SL RLF) between two UEs (e.g. UE1 and UE2). That is, when UE1 detects SL RLF corresponding to UE2, UE1 will release the related PC5 transmission resources (including e.g. the SL DRBs, SL SRBs, etc.) and then indicate upper layer of UE1 that PC5 Radio Resource Control (PC5-RRC) connection for UE2 is not available. Since UE2 is not available to UE1, UE1 could send a second SidelinkUEInformation message to gNB for updating the destination list (e.g. exclude UE2's L2ID from the updated destination list) so that gNB can configure UE1 to release the related PC5 AS configuration.

In UE-to-Network (U2N) Relay, according to the 3GPP email discussion [Post115-e][603][Relay] Relaying CR to 38.331 ("Draft_38331 Running CR for SL relay_v14_rapp.docx"), if the remote UE detects SL RLF for any destination while the remote UE in RRC_CONNECTED connects with the relay UE, the remote UE will initiate RRC connection re-establishment procedure. In the RRC connection re-establishment procedure, the remote UE could try to find a new suitable cell or a new relay UE. If the remote UE finds the new suitable cell, the remote UE will apply the specified CCCH configuration. If the remote UE finds the new relay UE, the remote UE will apply the specified configuration of SL-RLC0. According to TS38.331, a UE may send SRB0 message (e.g. RRCSetupRequest, RRCReestablishmentRequest, RRCSystemInfoRequest, and/or etc.) to gNB.

Realistically, when the UE applies the specified default configuration for SRB0, the UE creates and/or stores the context of SRB0 (e.g. configuration of RLC entity for SRB0, L1 parameters, and/or etc.) in the memory of the UE. In case of U2N Relay, the remote UE may have created and/or stored a first context of SL-RLC0 for sending SRB0 message when the remote UE connects with the relay UE and establishes a RRC connection with a gNB via the relay UE by sending RRCSetupRequest message to the gNB via the relay UE. However, in the 3GPP email discussion [Post115-e][603][Relay] Relaying CR to 38.331 ("Draft_38331 Running CR for SL relay_v14_rapp.docx"), it does not specify or introduce whether and how the remote UE should release the first context of SL-RLC0 after the RRCSetupRequest message is sent.

When the remote UE needs to perform the RRC connection re-establishment procedure and considers to select the new suitable cell during the RRC connection re-establishment procedure, the remote UE may create and/or store a second context of SRB0 for sending RRCReestablishmentRequest message to the new suitable cell. Similarly, the remote UE in the beginning could directly connect to gNB. Thus, the remote UE may have created and/or stored the second context of SRB0 for sending RRCSetupRequest message to gNB. When the remote UE detects physical layer problem with gNB, the remote UE could perform the RRC connection re-establishment procedure and consider to find the new relay UE during the RRC connection re-establishment procedure.

In this situation, the remote UE may create and/or store the first context of SL-RLC0 for sending RRCReestablishmentRequest message to the new relay UE. In both situations, lower layer (e.g., Packet Data Convergence Protocol (PDCP) layer, Radio Link Control (RLC) layer, Medium Access Control (MAC) layer, and/or Physical (PHY) layer) of the remote UE may have the first context of SL-RLC0 and the second context of SRB0 and may have no idea how to choose which one context for sending the RRCReestablishmentRequest message. In other words, the remote UE may have no idea which one RLC entity (RLC entity for SRB0 or PC5 RLC entity of SL-RLC0) should be used for sending the RRCReestablishmentRequest message. The choice between two contexts for sending SRB0 message is not needed to be specified or introduced in TS38.331 since the normal UE has one and only one context of SRB0 for sending SRB0 message when the UE is within a cell (and can directly connect to gNB). Furthermore, it is not needed to specify whether the normal UE should release the stored context of SRB0.

To address the issue, the remote UE could release the first context of SL-RLC0 if/after/when/upon/in case the remote UE selects a (new) suitable cell. Or, the remote UE could release the first context of SL-RLC0 in response to selection of the (new) suitable cell. Similarly, the remote UE could release the second context of SRB0 if/after/when/upon/in case the remote UE selects a (new) relay UE. Furthermore, the remote UE could release the second context of SRB0 in response to selection of the (new) relay UE.

In one embodiment, the remote UE could release or not use the RLC entity for SL-RLC0 or the PC5 RLC entity for sending SRB0 message if/after/when/upon/in case the remote UE selects a (new) suitable cell. More specifically, the remote UE could release or not use the RLC entity for SL-RLC0 or the PC5 RLC entity for sending SRB0 message in response to selection of a (new) suitable cell.

In one embodiment, the remote UE could (choose/determine/select to) use the RLC entity for SRB0 or the Uu RLC entity for sending SRB0 message if/after/when/upon/in case the remote UE selects a (new) suitable cell. More specifically, the remote UE could (choose/determine/select to) use the RLC entity for SRB0 or the Uu RLC entity for sending SRB0 in response to selection of a (new) suitable cell.

In one embodiment, the remote UE could release or not use the RLC entity for SRB0 or the Uu RLC entity for sending SRB0 message if/after/when/upon/in case the remote UE selects a (new) relay UE. More specifically, the remote UE could release or not use the RLC entity for SRB0 or the Uu RLC entity for sending SRB0 message in response to selection of a (new) relay UE.

In one embodiment, the remote UE could (choose/determine/select to) use the RLC entity for SL-RLC0 or the PC5 RLC entity for sending SRB0 message if/after/when/upon/in case the remote UE selects a (new) relay UE. More specifically, the remote UE could (choose/determine/select to) use the RLC entity for SL-RLC0 or the PC5 RLC entity for sending SRB0 in response to selection of a (new) relay UE.

Here are some potential text proposals:

---

Start of text proposal 5.3.7.3a    Actions following relay selection while [T311] is running
Upon selecting a suitable L2 U2N Relay UE, the L2 U2N Remote UE shall:
    1> ensure having valid and up to date essential system information as specified in clause
        5.2.2.2;
    1> stop timer [T311];
    1> if T390 is running:
        2> stop timer T390 for all access categories;
        2> perform the actions as specified in 5.3.14.4;
    1> start timer [T301];
    1> initiate the PC5 unicast link establishment as specified in TS 23.304 [x1];
    1> release RLC entity for SRB0;
    1> apply the specified configuration of SL-RLC0 as specified in 9.1.1.4;
    1> initiate transmission of the RRCReestablishmentRequest message in accordance with
        5.3.7.4.

Figure 13:
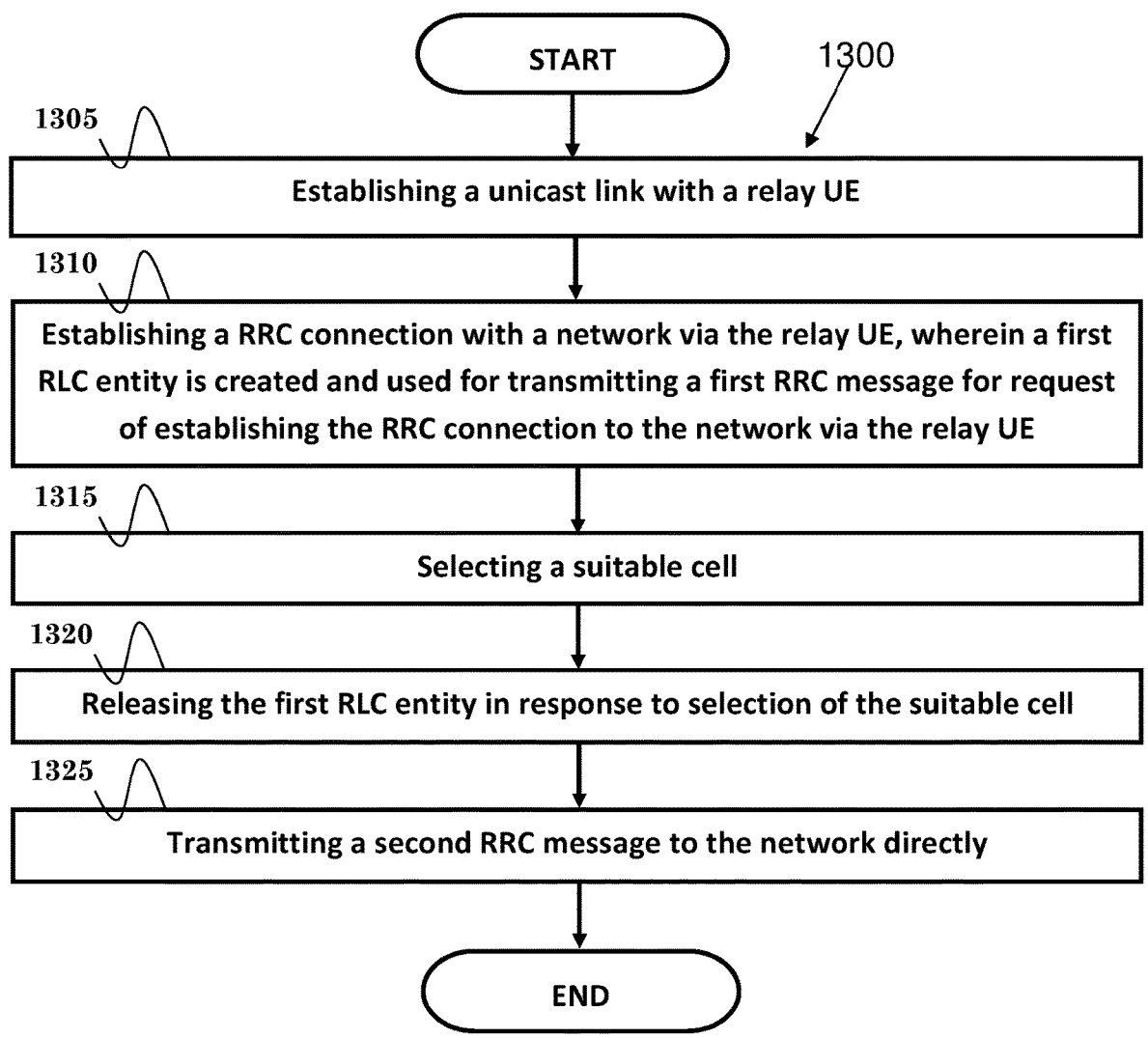
FIG. 13 is a flow chart according to one exemplary embodiment.

End of text proposal
Start of text proposal 5.3.7.3    Actions following cell selection while T311 is running
Upon selecting a suitable NR cell, the UE shall:
    1> ensure having valid and up to date essential system information as specified in clause
        5.2.2.2;
    1> stop timer T311;
    1> if T390 is running:
        2> stop timer T390 for all access categories;
        2> perform the actions as specified in 5.3.14.4;
    1> if the cell selection is triggered by detecting radio link failure of the MCG or re-
        configuration with sync failure of the MCG or mobility from NR failure, and
    1> if attemptCondReconfig is configured; and
    1> if the selected cell is one of the candidate cells for which the reconfigurationWithSync is
        included in the masterCellGroup in VarConditionalReconfig:
        2> apply the stored condRRCReconfig associated to the selected cell and perform actions
            as specified in 5.3.5.3;

NOTE 1: It is left to network implementation to how to avoid keystream reuse in case of CHO based recovery after a failed handover without key change.
1> else:
  2> if UE is configured with conditionalReconfiguration:
    3> reset MAC;
    3> release spCellConfig, if configured;
    3> release the MCG SCell(s), if configured;
    3> release delayBudgetReportingConfig, if configured and stop timer T342, if running;
    3> release overheatingAssistanceConfig, if configured and stop timer T345, if running;
    3> if MR-DC is configured:
      4> perform MR-DC release, as specified in clause 5.3.5.10;
    3> release idc-AssistanceConfig, if configured;
    3> release btNameList, if configured;
    3> release wlanNameList, if configured;
    3> release sensorNameList, if configured;
    3> release drx-PreferenceConfig for the MCG, if configured and stop timer T346a associated with the MCG, if running;
    3> release maxBW-PreferenceConfig for the MCG, if configured and stop timer T346b associated with the MCG, if running;
    3> release maxCC-PreferenceConfig for the MCG, if configured and stop timer T346c associated with the MCG, if running;
    3> release maxMIMO-LayerPreferenceConfig for the MCG, if configured and stop timer T346d associated with the MCG, if running;
    3> release minSchedulingOffsetPreferenceConfig for the MCG, if configured and stop timer T346e associated with the MCG, if running;
    3> release releasePreferenceConfig, if configured and stop timer T346f, if running;
    3> release onDemandSIB-Reguest if configured, and stop timer T350, if running;
    3> release referenceTimePreferenceReporting, if configured;
    3> release sl-AssistanceConfigNR, if configured;
    3> release obtainCommonLocation, if configured;
    3> suspend all RBs, except SRB0;
  2> remove all the entries within VarConditionalReconfig, if any;
  2> for each measId, if the associated reportConfig has a reportType set to condTriggerConfig:
    3> for the associated reportConfigId:
      4> remove the entry with the matching reportConfigId from the reportConfigList within the VarMeasConfig;
    3> if the associated measObjectId is only associated to a reportConfig with reportType set to condTriggerConfig:
      4> remove the entry with the matching measObjectId from the measObjectList within the VarMeasConfig;
    3> remove the entry with the matching measId from the measIdList within the VarMeasConfig;
  2> release PC5 RLC entity for SRB0 or RLC entity for SL-RLC0;
  2> start timer T301;
  2> apply the default L1 parameter values as specified in corresponding physical layer specifications except for the parameters for which values are provided in SIB1;
  2> apply the default MAC Cell Group configuration as specified in 9.2.2;
  2> apply the CCCH configuration as specified in 9.1.1.2;
  2> apply the timeAlignmentTimerCommon included in SIB1;
  2> initiate transmission of the RRCReestablishmentRequest message in accordance with 5.3.7.4;
NOTE 2: This procedure applies also if the UE returns to the source PCell.
Upon selecting an inter-RAT cell, the UE shall:
  1> perform the actions upon going to RRC_IDLE as specified in 5.3.11, with release cause 'RRC connection failure'.
End of text proposal FIG. 13 is a flow chart 1300 from the perspective of a remote UE. In step 1305, the remote UE establishes a unicast link with a relay UE. In step 1310, the remote UE establishes a Radio Resource Control (RRC) connection with a network via the relay UE, wherein a first Radio Link Control (RLC) entity is created and used for transmitting a first RRC message for request of establishing the RRC connection to the network via the relay UE. In step 1315, the remote UE selects a suitable cell. In step 1320, the remote UE releases the first RLC entity in response to selection of the suitable cell. In step 1325, the remote UE transmits a second RRC message to the network directly.

In one embodiment, the remote UE could initiate a procedure for re-establishing the RRC connection. A second RLC entity could be created and used for transmitting the second RRC message to the network. The first RRC message could be a RRCSetupRequest message, and the second RRC message could be a RRCReestablishmentRequest message. The network may contain at least a base station or a gNB.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a unicast link with a relay UE, (ii) to establish a RRC connection with a network via the relay UE, wherein a first RLC entity is created and used for transmitting a first RRC message for request of establishing the RRC connection to the network via the relay UE, (iii) to select a suitable cell, (iv) to release the first RLC entity in response to selection of the suitable cell, and (v) to transmit a second RRC message to the network directly. Furthermore, the CPU 308 can execute the program code 312 to perform all of the above-described actions and steps or others described herein.

Figure 14:
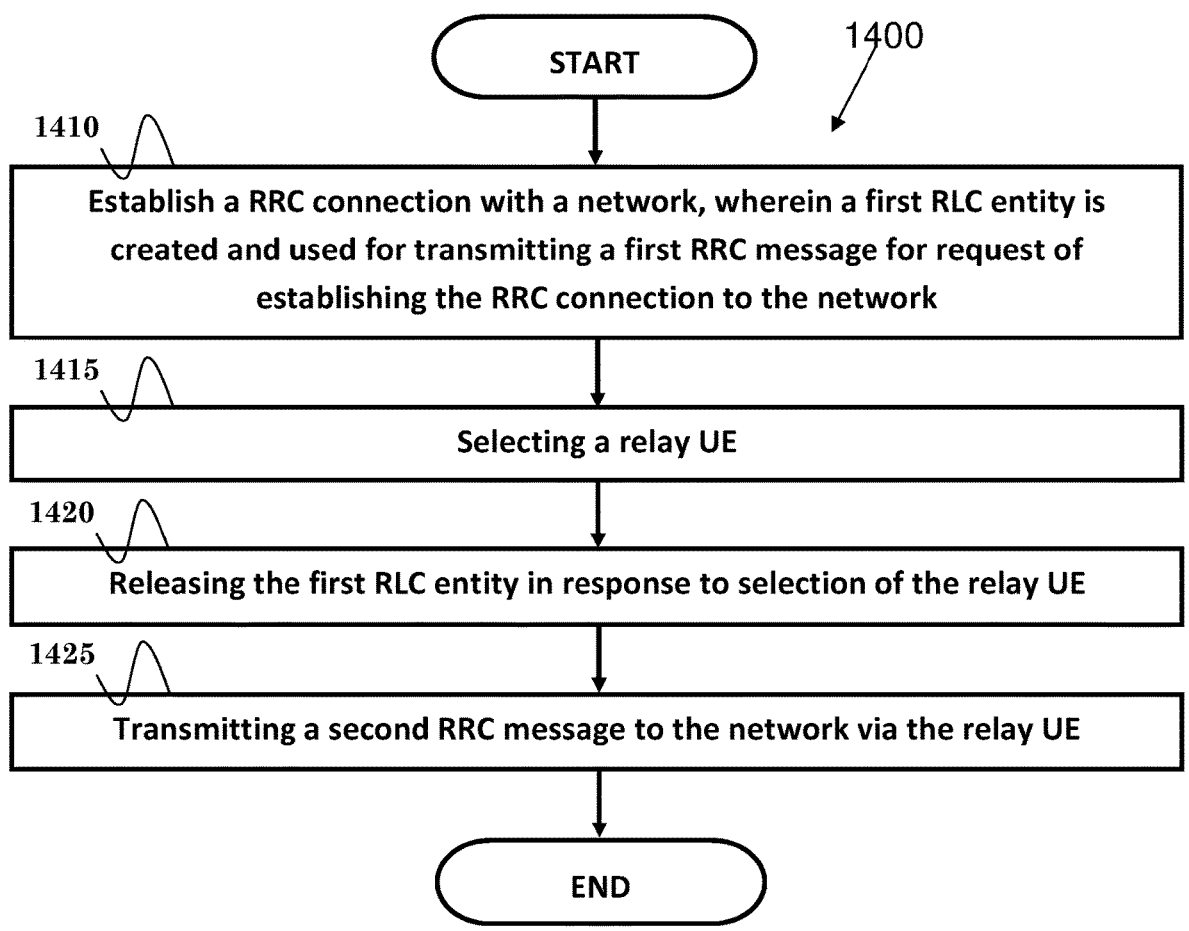
FIG. 14 is a flow chart according to one exemplary embodiment.

FIG. 14 is a flow chart 1400 from the perspective of a remote UE. In step 1405, the remote UE establishes a Radio Resource Control (RRC) connection with a network, wherein a first Radio Link Control (RLC) entity is created and used for transmitting a first RRC message for request of establishing the RRC connection to the network. In step 1410, the remote UE selects a relay UE. In step 1415, the remote UE releases the first RLC entity in response to selection of the relay UE. In step 1420, the remote UE transmits a second RRC message to the network via the relay UE.

In one embodiment, the remote UE could initiate a procedure for re-establishing the RRC connection. A second RLC entity could be created and used for transmitting the second RRC message to the network via the relay UE. The first RRC message could be a RRCSetupRequest message, and the second RRC message could be a RRCReestablishmentRequest message. The network may contain at least a base station or a gNB.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a RRC connection with a network, wherein a first RLC entity is created and used for transmitting a first RRC message for request of establishing the RRC connection to the network, (ii) to select a relay UE, (iii) to release the first RLC entity in response to selection of the relay UE, and (iv) to transmit a second RRC message to the network via the relay UE. Furthermore, the CPU 308 can execute the program code 312 to perform all of the above-described actions and steps or others described herein.

Figure 15:
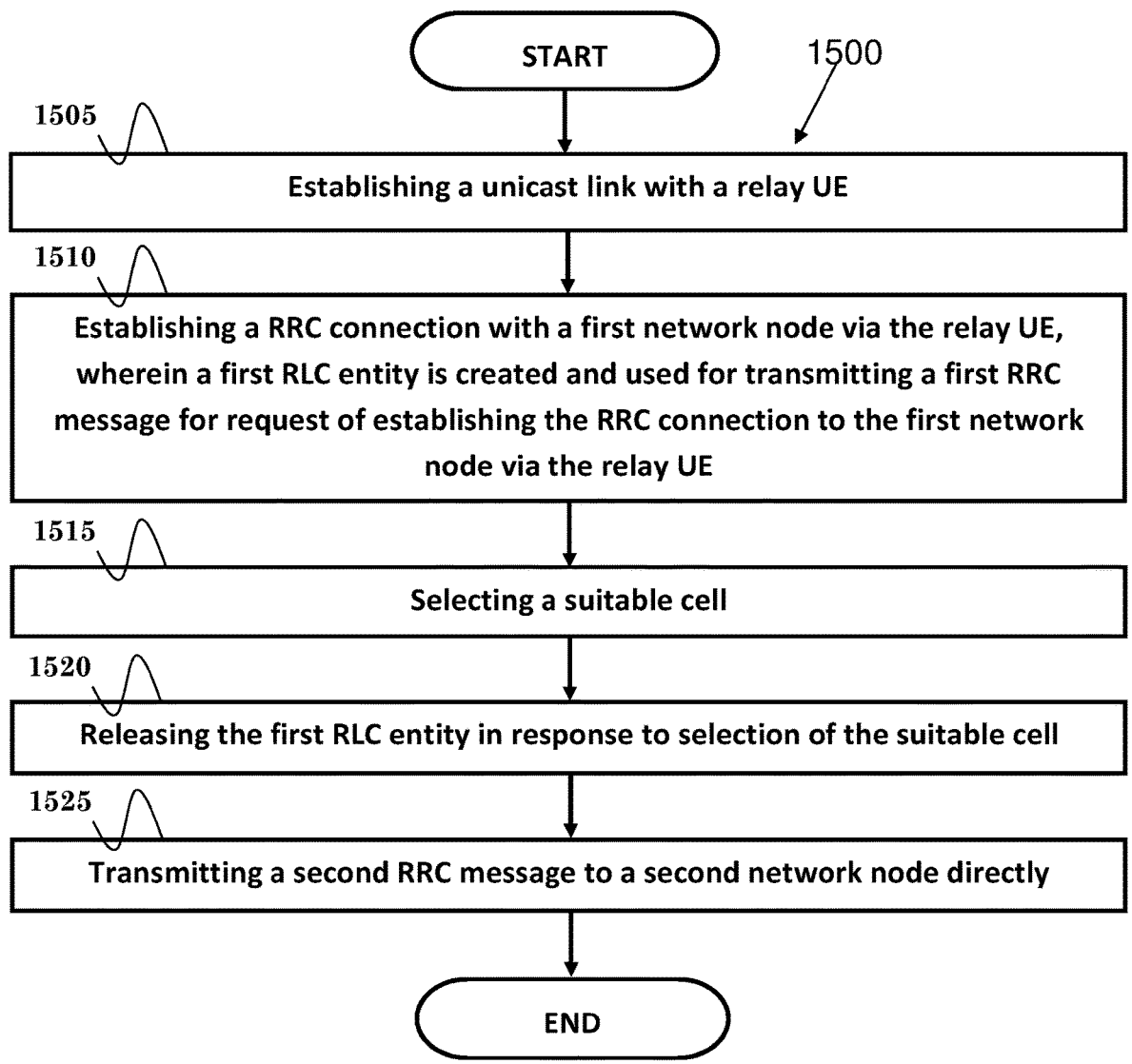
FIG. 15 is a flow chart according to one exemplary embodiment.

FIG. 15 is a flow chart 1500 from the perspective of a remote UE. In step 1505, the remote UE establishes a unicast link with a relay UE. In step 1510, the remote UE establishes a RRC connection with a first network node via the relay UE, wherein a first RLC entity is created and used for transmitting a first RRC message for request of establishing the RRC connection to the first network node via the relay UE. In step 1515, the remote UE selects a suitable cell. In step 1520, the remote UE releases the first RLC entity in response to selection of the suitable cell. In step 1525, the remote UE transmits a second RRC message to a second network node directly.

In one embodiment, the remote UE could receive a third RRC message from the first network node via the relay UE for establishing the RRC connection. The remote UE could transmit a fourth RRC message to the first network node via the relay UE for completing establishment of the RRC connection. The remote UE could detect a sidelink radio link failure on the unicast link. The remote UE could initiate a procedure for re-establishing the RRC connection in response to the sidelink radio link failure.

In one embodiment, the second RRC message could be used for request of re-establishing the RRC connection. The remote UE could receive a fifth RRC message from the second network node for re-establishing the RRC connection. The remote UE could transmit a sixth RRC message to the second network node for completing of re-establishment of the RRC connection.

In one embodiment, the first or second network node could be a base station or a gNB. The first network node and the second network node could be the same base station or gNB. The first RRC message could be a RRCSetupRequest message. The second RRC message could be a RRCReestablishmentRequest message. The third RRC message could be a RRCSetup message. The fourth RRC message could be a RRCSetupComplete message. The fifth RRC message could be a RRCReestablishment message. The sixth RRC message could be a RRCReestablishmentComplete message.

In one embodiment, a second RLC entity could be created and used for transmitting the second RRC message to the second network node.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a unicast link with a relay UE, (ii) to establish a RRC connection with a first network node via the relay UE, wherein a first RLC entity is created and used for transmitting a first RRC message for request of establishing the RRC connection to the first network node via the relay UE, (iii) to select a suitable cell, (iv) to release the first RLC entity in response to selection of the suitable cell, and (v) to transmit a second RRC message to a second network node directly. Furthermore, the CPU 308 can execute the program code 312 to perform all of the above-described actions and steps or others described herein.

Figure 16:
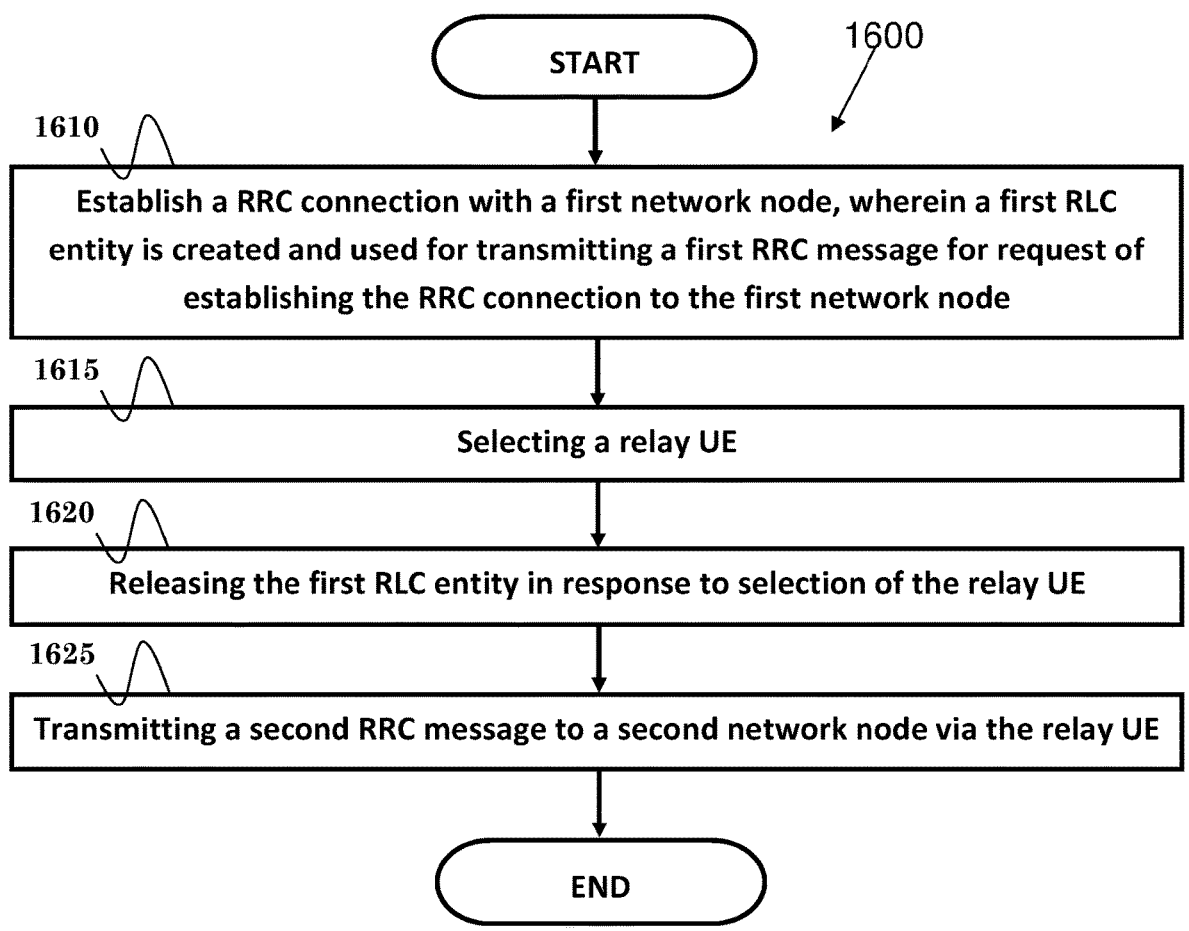
FIG. 16 is a flow chart according to one exemplary embodiment.

FIG. 16 is a flow chart 1600 from the perspective of a remote UE. In step 1605, the remote UE establishes a RRC connection with a first network node, wherein a first Radio Link Control (RLC) entity is created and used for transmitting a first RRC message for request of establishing the RRC connection to the first network node. In step 1610, the remote UE selects a relay UE. In step 1615, the remote UE releases the first RLC entity in response to selection of the relay UE. In step 1620, the remote UE transmits a second RRC message to a second network node via the relay UE.

In one embodiment, the remote UE could establish a unicast link with the relay UE. The remote UE could receive a third RRC message from the first network node for establishing the RRC connection. The remote UE could transmit a fourth RRC message to the first network node for completing establishment of the RRC connection. The remote UE could initiate a procedure for re-establishing the RRC connection. The second RRC message could be used for request of re-establishing the RRC connection. The remote UE could receive a fifth RRC message from the second network node via the relay UE for re-establishing the RRC connection. The remote UE could transmit a sixth RRC message to the second network node via the relay UE for completing of re-establishment of the RRC connection.

In one embodiment, the first or second network node could be a base station or a gNB. The first network node and the second network node could be the same base station or gNB. The first RRC message could be a RRCSetupRequest message. The second RRC message could be a RRCReestablishmentRequest message. The third RRC message could be a RRCSetup message. The fourth RRC message could be a RRCSetupComplete message. The fifth RRC message could be a RRCReestablishment message. The sixth RRC message could be a RRCReestablishmentComplete message.

In one embodiment, a second RLC entity could be created and used for transmitting the second RRC message to the second network node via the relay UE.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a RRC connection with a first network node, wherein a first RLC entity is created and used for transmitting a first RRC message for request of establishing the RRC connection to the first network node, (ii) to select a relay UE, (iii) to release the first RLC entity in response to selection of the relay UE, and (iv) to transmit a second RRC message to a second network node via the relay UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a remote User Equipment (UE), comprising:
   establishing a unicast link with a relay UE;
   establishing a Radio Resource Control (RRC) connection with a network via the relay UE, wherein a first Radio Link Control (RLC) entity is created and used for transmitting a first RRC message for request of establishing the RRC connection to the network via the relay UE;
   selecting a suitable cell;
   releasing the first RLC entity in response to selection of the suitable cell; and transmitting a second RRC message to the network directly.

2. The method of claim 1, further comprising:
initiating a procedure for re-establishing the RRC connection.

3. The method of claim 1, wherein a second RLC entity is created and used for transmitting the second RRC message to the network.

4. The method of claim 1, wherein the first RRC message is a RRCSetupRequest message, and the second RRC message is a RRCReestablishmentRequest message.

5. The method of claim 1, wherein the network contains at least a base station or a gNB.

6. A method for a remote User Equipment (UE), comprising:
establishing a Radio Resource Control (RRC) connection with a network, wherein a first Radio Link Control (RLC) entity is created and used for transmitting a first RRC message for request of establishing the RRC connection to the network;
selecting a relay UE;
releasing the first RLC entity in response to selection of the relay UE; and
transmitting a second RRC message to the network via the relay UE.

7. The method of claim 6, further comprising:
initiating a procedure for re-establishing the RRC connection.

8. The method of claim 6, wherein a second RLC entity is created and used for transmitting the second RRC message to the network via the relay UE.

9. The method of claim 6, wherein the first RRC message is a RRCSetupRequest message, and the second RRC message is a RRCReestablishmentRequest message.

10. The method of claim 6, wherein the network contains at least a base station or a gNB.

11. A remote UE (User Equipment), comprising:
a control circuit;
a processor installed in the control circuit; and
a memory installed in the control circuit and operatively coupled to the processor;
wherein the processor is configured to execute a program code stored in the memory to:
establish a unicast link with a relay UE;
establish a Radio Resource Control (RRC) connection with a network via the relay UE, wherein a first Radio Link Control (RLC) entity is created and used for transmitting a first RRC message for request of establishing the RRC connection to the network via the relay UE;
select a suitable cell;
release the first RLC entity in response to selection of the suitable cell; and
transmit a second RRC message to the network directly.

12. The remote UE of claim 11, wherein the processor is further configured to execute a program code stored in the memory to:
initiate a procedure for re-establishing the RRC connection.

13. The remote UE of claim 11, wherein a second RLC entity is created and used for transmitting the second RRC message to the network.

14. The remote UE of claim 11, wherein the first RRC message is a RRCSetupRequest message, and the second RRC message is a RRCReestablishmentRequest message.

15. The remote UE of claim 11, wherein the network contains at least a base station or a gNB.

16. A remote UE (User Equipment), comprising:
a control circuit;
a processor installed in the control circuit; and
a memory installed in the control circuit and operatively coupled to the processor;
wherein the processor is configured to execute a program code stored in the memory to:
establish a Radio Resource Control (RRC) connection with a network, wherein a first Radio Link Control (RLC) entity is created and used for transmitting a first RRC message for request of establishing the RRC connection to the network;
select a relay UE;
release the first RLC entity in response to selection of the relay UE; and
transmit a second RRC message to the network via the relay UE.

17. The remote UE of claim 16, wherein the processor is further configured to execute a program code stored in the memory to:
initiate a procedure for re-establishing the RRC connection.

18. The remote UE of claim 16, wherein a second RLC entity is created and used for transmitting the second RRC message to the network via the relay UE.

19. The remote UE of claim 16, wherein the first RRC message is a RRCSetupRequest message, and the second RRC message is a RRCReestablishmentRequest message.

20. The remote UE of claim 16, wherein the network contains at least a base station or a gNB.

* * * * *